US007131069B1

(12) United States Patent
Rush et al.

(10) Patent No.: US 7,131,069 B1
(45) Date of Patent: Oct. 31, 2006

(54) NAVIGATIONAL INTERFACE FOR ERP SYSTEM

(75) Inventors: Gary W. Rush, Lafayette, IN (US); Herman J. Kiefus, Lafayette, IN (US)

(73) Assignee: Made2 Manage Systems, Inc., Indianapolis, IN (US)

( * ) Notice: Subject to any disclaimer, the term of this patent is extended or adjusted under 35 U.S.C. 154(b) by 0 days.

(21) Appl. No.: 09/743,152

(22) PCT Filed: Oct. 22, 1999

(86) PCT No.: PCT/US99/24859

§ 371 (c)(1),
(2), (4) Date: Jan. 5, 2001

(87) PCT Pub. No.: WO00/23874

PCT Pub. Date: Apr. 27, 2000

Related U.S. Application Data

(60) Provisional application No. 60/105,287, filed on Oct. 22, 1998.

(51) Int. Cl.
G09G 5/00 (2006.01)

(52) U.S. Cl. .................. 715/738; 715/854; 705/26

(58) Field of Classification Search ................ 345/851, 345/780, 853–855, 734, 710, 713, 824–825, 345/804–805, 776, 835, 841, 845; 709/206, 709/202, 208, 223, 227; 705/50, 51, 52, 705/2, 4, 5–6, 7–9, 11, 13, 16, 17, 22, 26, 705/27, 30, 33, 39, 40; 715/853–855, 526–530, 715/780, 821–824, 825, 802, 804–805, 745, 715/747, 811, 776, 835, 838, 712–713, 817–820, 715/734, 740, 769, 841, 845, 854, 813, 738; 707/1, 10, 104
See application file for complete search history.

(56) References Cited

U.S. PATENT DOCUMENTS 5,463,555 A    10/1995  Ward et al. .................... 705/28

(Continued)

FOREIGN PATENT DOCUMENTS

JP    408069489 A  *  3/1996

OTHER PUBLICATIONS

IBM Technical Disclosure Bulletin, "Document Based Customization and Adaptation of Process" vol. 37 issue 9, pp. 629-630, Sep. 1994.*

(Continued)

Primary Examiner—Steven P. Sax
(74) Attorney, Agent, or Firm—Doreen Gridley; Homer W. Faucett, III; Ice Miller LLP

(57) ABSTRACT

The present invention comprises a software system having a user-friendly navigational interface utilizing an hierarchical display (20) of business documents based upon a dominant-subordinate relationship between the documents. In one embodiment, the documents are related through the use of keys, which define a relationship between the dominant (81) and the subordinate documents (91). In conjunction with the selection of a specific document, the invention displays information related to that document which can be custom defined by the user. In one embodiment, each user can define a unique set of data to be displayed. The invention further provides a means by which the underlying data can be easily edited from the hierarchical display (20). The present invention also allows the creation of expressions (230, 231) that will alert the user to predetermined conditions. The alert is displayed in conjunction with the hierarchical display (20) of a document, but the expression (230, 231) may be defined by data not normally contained within the document. Each user can define a unique set of alerts for various documents. The present invention further comprises a visual rendering of predefined expressions describing the progress of work related to a document and each user can also define a unique set of progress of expressions (250) for various documents based on conditions of particular interest to the user.

63 Claims, 14 Drawing Sheets

U.S. PATENT DOCUMENTS

| | | | | |
|---|---|---|---|---|
| 5,801,702 | A | | 9/1998 | Dolan et al. ............... 345/357 |
| 5,903,902 | A | | 5/1999 | Orr et al. ................... 707/517 |
| 5,923,328 | A | * | 7/1999 | Griesmer ................... 345/854 |
| 5,958,012 | A | | 9/1999 | Battat et al. ............... 345/969 |
| 5,960,200 | A | * | 9/1999 | Eager et al. ............... 717/147 |
| 5,963,208 | A | * | 10/1999 | Dolan et al. ............... 345/760 |
| 5,963,922 | A | | 10/1999 | Helmering .................. 705/35 |
| 5,966,707 | A | | 10/1999 | Van Huben et al. ........ 707/200 |
| 5,987,443 | A | | 11/1999 | Nichols et al. ............... 706/11 |
| 5,987,471 | A | | 11/1999 | Bodine et al. ............. 345/356 |
| 5,991,776 | A | | 11/1999 | Bennett et al. ............ 707/205 |
| 6,101,515 | A | * | 8/2000 | Wical et al. ................ 715/531 |
| 6,233,545 | B1 | * | 5/2001 | Datig ............................ 704/2 |
| 6,404,446 | B1 | * | 6/2002 | Bates et al. ................ 345/854 |
| 6,415,298 | B1 | * | 7/2002 | Oesterer et al. ........... 707/203 |
| 6,453,312 | B1 | * | 9/2002 | Goiffon et al. ................ 707/3 |
| 6,591,244 | B1 | * | 7/2003 | Jim et al. ....................... 705/9 |
| 6,591,260 | B1 | * | 7/2003 | Schwarzhoff et al. ......... 707/2 |
| 6,606,620 | B1 | * | 8/2003 | Sundaresan et al. ........... 707/3 |
| 6,622,137 | B1 | * | 9/2003 | Ravid et al. .................. 706/47 |
| 6,665,662 | B1 | * | 12/2003 | Kirkwood et al. ............. 707/3 |
| 6,678,705 | B1 | * | 1/2004 | Berchtold et al. .......... 707/204 |
| 6,728,733 | B1 | * | 4/2004 | Tokui .......................... 707/200 |
| 6,748,421 | B1 | * | 6/2004 | Ozkan et al. ............... 709/206 |
| 6,981,222 | B1 | * | 12/2005 | Rush et al. ................. 715/738 |

OTHER PUBLICATIONS

Web Pages from http://www.macola.com, "System Overview—Progression Series Version 7.5".

Web Pages from http://www.shersoft.com, "Product Information—Active Tree View Features and Highlights".

Johnson, R. Colin, "HotSauce maps data into 3-D format,", Electronic Engineering Times, Oct. 21, 1996, No. 924, p. 140.

Brochure from FRx Software Corporation entitled "FRx for Windows".

VHS tape entitled "Visual Manufacturing".

Brochure for "Visual Manufacturing™", Lilly Software Associates, Inc., 500 Lafayette Road, Hampton, NH.

Stevens, David P., "Building the perfect Platform", Wall Street & Technology, Jul. 1997, vol. 15, No. 7, p. 100-102.

Feibus, Andy, "Active Reports: New Pick for VB Developers", Informationweek, May 11, 1998, No. 681, p. 6A-12A.

Netscape 3.0, Mark R. Brown, Complete Reference Using Netscape 3.0, pp. 204-209; 590-597, 1996.

MECA Software, Inc., Managing Your Money for Windows User's Guide, 1994, pp. 1-251.

Feibus, Andy, "ActiveReports: New Pick for VB Developers", Informationweek, May 11, 1998, No. 681, p. 6A-12A.

The Windows Sources catalog (Buyer Guide), Gale Group Computing, Sep. 1993.

Managing Your Money for Windows, User's Guide, MECA Software, Inc. 1994. pp. 1-32, 89-92, 112-113, 122-123, 222, 231, 237-238, 243-251.

Netscape 3.0, Mark R. Brown, Complete Reference Using Netscape 3.0 pp. 204-209; 590-597, 1996.

\* cited by examiner

NAVIGATIONAL INTERFACE FOR ERP SYSTEM

This application claims the benefit of U.S. Provisional Patent Application 60/105,287 filed Oct. 22, 1998.

FIELD OF THE INVENTION

The present invention relates to software interface systems, and in particular, to methods for providing quick and intuitive navigation to stored information normally available in different business documents.

BACKGROUND

Computer technology, related to both hardware and software, has revolutionized the way business is conducted. At one time, the scarcity of information was a major hurdle for various businesses to overcome. As a result of advancements in computers and information technology, businesses are frequently faced with information overload, since virtually every piece of information related to an enterprise is capable of being stored digitally, and thus being widely accessible, In health related fields, a patient's prescription drug history, insurance information, office visit results and x-rays can be stored in computer memory. A particular stock may be researched, ordered, and the transaction charged to an account, every step being accomplished via computer. Information overload is further exacerbated by the need to rapidly consolidate and assess information. This speed may be necessary in order to compete effectively, to exploit specific market conditions, or to correctly treat a patient in a medical emergency. Further, while much of the information can be stored in a common database, the user interface tends to be designed with a focus on the discipline that is primarily responsible for the information. The resultant interface is confusing to all but those familiar with the particular discipline. Information overload can thus be described as a problem of too much information and less time to rely on interface with another human being confounded by a foreign computer interface.

A specific example of this can be found in Enterprise Resource Planning (ERP) software. Prior to ERP software, a business would generally use different software applications to automate different functional departments of a business. For example, accounting, order entry, manufacturing, inventory and shipping departments would each use their own software systems. While these individual departments can achieve improved operational efficiency through software, the business as a whole would not realize the potential afforded by information technology because the individual software applications may not smoothly interface with each other, and there could be significant duplication of data across the individual systems.

With ERP software, all of the different functional applications for a business share a common database, so all data is entered only once. Moreover, there is a seamless integration of data between disparate applications, so data generated by one application can be immediately used by any other application. Due to the use of a comprehensive database, ERP systems permit enhanced analysis of a business' data.

However, because ERP systems provide such comprehensive access to a business' data, they suffer from having an end user interface that is difficult to learn. Generally, an ERP system is used by nearly every person in every operational department, even though each user only accesses a small portion of the data in the entire ERP system. This tends to make ERP user interfaces inherently complicated, particularly for end users that need to access information outside of the end user's normal area of expertise. For example, while a sales person may become proficient in accessing quotation or sales order information in an ERP system, if customer asks the sales person a question about the shipment or invoice for a particular order, the ERP user interface will usually make it difficult for the sales person find the information, because the user interface for shippers and invoices is likely to be unfamiliar to the sales person.

SUMMARY OF THE INVENTION

The present invention comprises a software system having a user-friendly navigational interface utilizing an hierarchical display of business documents based upon a dominant-subordinate relationship between the documents. In one embodiment, the documents are related through the use of keys, which define a relationship between the dominant and the subordinate documents. In conjunction with the selection of a specific document, the invention displays information related to that document. The information to be displayed can be custom defined by the user. In one embodiment, each user can define a unique set of data to be displayed. The invention further provides a means by which the underlying data can be easily edited from the hierarchical display.

The present invention also allows the creation of expressions that will alert the user to predetermined conditions. The alert is displayed in conjunction with the hierarchical display of a document, but the expression may be defined by data not normally contained within the document. In one embodiment, each user can define a unique set of alerts for various documents based on conditions of particular interest to the user.

The present invention further comprises a visual rendering of predefined expressions describing the progress of work related to a document. This rendering may be based on data not normally contained within the given document. In one embodiment, each user can define a unique set of progress expressions for various documents based on conditions of particular interest to the user.

BRIEF DESCRIPTION OF THE DRAWINGS

FIG. 10 is a representative data-editing screen for a customer record type business document.

FIG. 11 is a representative data-editing screen for part of a sales quote type business document.

DETAILED DESCRIPTION

Definitions

Figure 1:
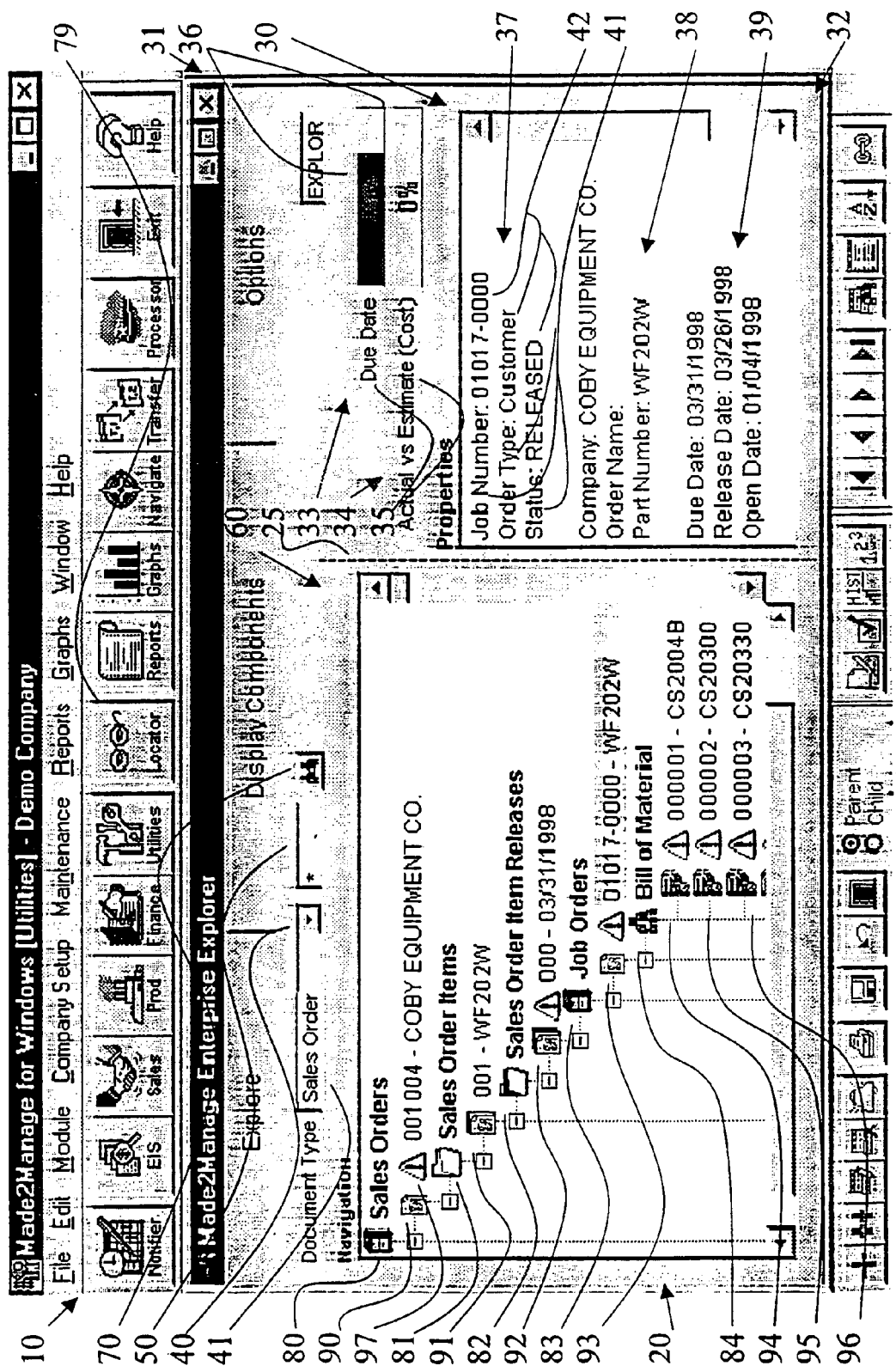
FIG. 1 is a representative excerpt of a pane showing a hierarchical arrangement of different types of business documents.

A "document" is a compilation of information commonly found in a business environment. Descriptions of specific types of documents related to an ERP setting appear below.

A "sub-document" is a portion of a document and comprises types of information that may appear multiple times. For example, a sales order line item may comprise a quantity, product description, unit price and extended price. A sales order line item is a sub-document because it is included within a larger document, namely a sales order.

A "document instance node" is an entry in a hierarchical tree structure associated with an instance of a representation of a business document, which, when selected, allows information associated with the specific document to be displayed. In the preferred mode, the node is an icon with identifying information adjacent. Alternatively, the node could be in the form of Hypertext, with or without an adjacent icon. It is preferable, although not mandatory, that the node-identifying information or hypertext displayed be sufficient to allow a user to uniquely identify the specific document. For example, a unique customer number, a unique customer name, or a unique composite of both customer number and customer name could represent a specific customer document. Customer name alone may not be sufficiently unique if, for example, a business sells to two different branch offices of the same customer. In this example, it may be the address of the office that differentiates the two customer record entries. Note that in this example, the specific instance could be associated with the node by the unique address of the customer, even if the address is not displayed when the document instance node is selected. It is also preferred in some instances to provide icons for various types of documents that allow the user to rapidly identify the type of document associated with the node. Several elements of the invention are invoked by the selection of a particular node, these elements are described elsewhere.

A "sub-document instance node" is an entry in a hierarchical tree structure that differs from a document instance node in that it is associated with a sub-document. This is useful within the context of the present invention since the line item of a document can form the bridge between two different business groups. For example, a sales force can create sales orders comprised of a list of products. However, while the manufacturing group must fill the entire order, it will be filled by fabricating the individual line items. Thus, the line items function as a bridge between the sales documents and the documents associated with manufacturing the items.

A "document type node" is a node that is used to symbolize a class of business document types. In the preferred embodiment, each "type" comprises a commonly used business document. Examples in an ERP setting include "Customers," "Sales Orders," "Job Orders" or "Accounts Payable Sub Ledger." For any document type node, instances of particular documents (if any) may be displayed in an immediately subordinate position to the document type node. Because, in one embodiment, the document type node is only a heading, it does not cause the display of information for a particular document. In one embodiment of the invention, the document type node is the mechanism by which all of the nodes subordinate to it can be collapsed or expanded to provide easier navigation of the hierarchical tree.

A "filter document type node" is a document type node that is displayed based on the evaluation of a "filter document type node expression." The filter document type node is displayed at the same level in the hierarchical tree structure as the document type node for the document instance for which the filter document type node expression was defined. Normally, the satisfaction of a filter document type node expression results in the filter document type node being displayed. While it is possible for the document instance node to only be displayed under the filter document type node and not the document type node when the filter document type node expression is satisfied, allowing the document instance to be displayed more than once in a given level allows for multiple filter document type node expressions to be defined for a given document.

A "filter document type node expression" is a predetermined, logical expression applied to data. It is not necessary that the data accessed to evaluate the logical expression be derived solely from the document referenced by a document instance node for which the filter document type node expression is defined. For example, a credit department manager might define a filter document type node expression for a customer document that evaluates to true if a customer's actual credit exceeds the business's authorized credit limit for that customer, based on evaluation of accounts receivable information for the customer. In one embodiment, each user can define a set of filter document type node expressions unique to that user.

A "sub-document type node" is a type node that symbolizes a class of sub-document types. In one embodiment of the invention, the sub-document type node is the mechanism by which all of the nodes subordinate to it can be collapsed or expanded to provide easier navigation of the hierarchical tree.

A "filter sub-document type node" is a sub-document type node that is displayed based on the evaluation of a "filter sub-document type node expression." The filter sub-document type node is displayed at the same level in the hierarchical tree structure as the sub-document type node for the sub-document instance for which the filter sub-document type node expression was defined. Normally, the satisfaction of a filter sub-document type node expression results in the filter sub-document type node being displayed. While it is possible for the sub-document instance node to only be displayed under the filter sub-document type node and not the sub-document type node when the filter sub-document type node expression is satisfied, allowing the sub-document instance to be displayed more than once in a given level allows for multiple filter sub-document type node expressions to be defined for a given sub-document.

A "filter sub-document type node expression" is a predetermined, logical expression applied to data. It is not necessary that the data accessed to evaluate the logical expression be derived solely from the sub-document referenced by a document instance node for which the filter document type node expression is defined. For example, a manufacturing manager might define a filter document type node expression for a job order line item that evaluates to true if a specific receiver document line item is entered. In one embodiment, each user can define a set of filter document type node expressions unique to that user.

A "container" refers to an array of elements wherein the elements may be, but need not be, of the same nature. For instance, a container may comprise an element made up of an alphanumeric code, followed by an element comprised of no more than four numbers. The container can be thought of as a bag, into which any desired data, of any form may be placed. In one embodiment of the present invention, containers comprise representations of business documents and sub-documents.

An "entry point" is a document type that may be selected by the user as the starting point or root for a navigation tree. In one embodiment, this selection is made via the user interface, or by launching the hierarchical display from a screen in which the document is referenced, such as an editing screen.

A "point of interest" is a visual indicator that is displayed next to a document or sub-document instance node based on the evaluation of a "point of interest expression". Normally, the satisfaction of a point of interest expression indicates a warning condition so as to alert the end user that further investigation is warranted.

A "point of interest expression" is a predetermined, logical expression applied to data. It is not necessary that the data accessed to evaluate the logical expression be derived solely from the document referenced by a document instance node next to which the resultant point of interest indicator would be displayed. For example, consider a customer document. An end user who is a credit manager may set a point of interest expression for a customer document that evaluates to true if a customer's actual credit exceeds the business's authorized credit limit for that customer, based on evaluation of accounts receivable information for the customer.

A "key" is a code that can be shared by two or more containers, pursuant to which there is a one-to-one or a one-to-many relationship between the two or more containers. This is accomplished in one embodiment by utilizing the concept of "primary key" and "foreign key" which is well known in the art. For example, where one container comprises a customer document, it may have a unique key that may be a unique customer name. This could be the primary key for the customer document. A quote business document may include or incorporate that unique customer name as a part of the unique quote business document identifier. However, the customer primary key comprises a foreign key when it is in the quote business document container. While it is not necessary that the keys be displayed to the user, it is useful in some contexts to use unique identifiers and identifier strings in the visual representation to the user. For example, continuing the above example with a customer name, such as "Joe's," as the primary key for a customer document, a sales order associated with that particular customer may merely append a code such as SO-001 to the customer primary key (signifying sales order 001). While in the sales order container, the key "Joe's-SO-001" would be the primary key, while "Joe's" would be a foreign key. Thus, as between any two types of documents, the primary key will always be a unique identifier for one of the containers; in other words, a key will not be common between two document types such that a many-to-many relationship between the two document types is created.

A "pane" comprises a two or three-dimensional area displayable on a computer screen. In one embodiment, both the first and second panes are displayed in a single window in a windows-based operating system, but the panes could also be displayed in different windows.

A "user class" is a uniquely identifiable group of users. It is possible, but not necessary to define a user class for each unique user.

A "visual progress bar" is a visual representation of the evaluation of a "visual progress bar expression". The representation in the preferred embodiment is in the form of a bar graph which progresses from zero (0) to one hundred (100) percent based upon the evaluation of the visual progress bar expression.

A "visual progress bar expression" is a user defined expression that evaluates to a numeric value. In one embodiment the expression is of the form x/y and evaluates to a number between 0 and 1. The expression may evaluate any data within the system.

A "breakpoint" is an expression that is defined by the user in conjunction with the visual progress bar expression, such that the color of the bar changes (e.g., from green to yellow to red) at predetermined values of X/Y. The invention further provides a means for reversing the order of the colors, such that the bar changes (e.g., from red to yellow to green) as the expression approaches one hundred (100) percent.

A "layer" is a dominant-subordinate relationship between documents or sub-documents of the same type wherein the subordinate document or sub-document represents a constituent part or step of the dominant document or sub-document.

A "representation of a business document" means a computer memory storing at least the minimal amount of information needed for a business document. In one embodiment the information is stored within containers. While a virtually unlimited number of permutations exist within various business settings, the minimal information for a reasonably useful system for the following documents in an ERP setting is as follows:

Customer: a unique customer identifier. This is normally a customer number or an email address. However, this may also be a customer name. Although not required, a customer record will often include an address, phone number, contact name, and credit limit;

Quote: a unique customer identifier, at least one quoted item, and a quoted pricing basis. The word "item" in this context need not refer to a discrete unit of a particular good. Similarly, the pricing basis may be as generic as "market value". Additional information which is not necessary, but which may be present in a quote includes, but is not limited to, available discounts for bulk purchases, shipping arrangements, and date of delivery information. Since there is not necessarily a contract at this point, the quoted price is an estimate of the final price;

Quote Item Bill of Material (BOM): a uniquely identified quote and at least one quoted item. In the simplest example, the item is a discrete unit, and the BOM is a discrete item. However, more complex items can incorporate a number of materials or sub-components;

Quote Item Routing Step: at least one quoted item and at least one operation. The operation may be as simple as transporting an item from place "A" on the manufacturing floor to place "B". However, this feature is particularly useful in make to order contexts where a routing step indicates a customization of a base product;

Sales Order: a unique customer identifier, a unique sales order identifier, at least one item, and a pricing scheme. A simple sales order is exemplified in an over the counter sales. However, an over the counter sale comprises information such as a definite quantity and price, which would not be present in a sales order for "all the items which can be produced in a month." In this more complicated sales order, it would be appropriate to have a per unit pricing scheme, possibly incorporating an incentive scheme. Other information which may be associated with a sales order would be a destination, a quantity, a release date, method of payment, and a need date. The price and the item in a sales order are definite, as contrasted with the quoted price and quoted item of a quote. This is not to say that the final cost is definite, as the price may be on a per unit basis;

Sales Order Item Release: a unique sales order identifier, at least one item, and an indication of time. While the indication of time might be as simple as "when available", a sales order item release is particularly useful when a customer prefers to have delivery of purchases staggered over some period of time. In this context, a sales order item release might also include a quantity of items to be released on a specific day. This arrangement allows a price to be established based on a large number of items being purchased, while not creating an excessive need for manufacturing or warehouse capacity since delivery is spread out over time. Additional information may include shipping information;

Sales Order Item Bill of Material (BOM): a unique sales order, and at least one item. Sales order BOMs are used to track the complete list of materials comprising the sales order item;

Sales Order Item Routing Step: a unique sales order item and at least one operation;

Job Order: a unique job order identifier, and an item identifier. Other fields which can be usefully associated with a job order include a release date, a need date, and fields to accumulate costs against the job order. Typical cost fields include material, labor, and overhead;

Job Order Bill of Material (BOM): a unique job order identifier, and at least one item.

Job Order Routing Step: a unique job order identifier, at least one item, and at least one operation.

Shipper: when used to send a product to a customer, a shipper comprises a unique customer identifier, at least one item to be shipped, and a means for determining a shipping date. Alternatively, a shipper may be used when shipping an item to a sub-contractor. In this case, the shipper comprises a unique vendor identifier, at least one item to be shipped, a purchase order identifier, and a means for determining a shipping date. Commonly, this document will also contain freight and shipping charges, and a carrier. In either context, additional information within a shipper optionally comprises freight and shipping charges, a carrier, and the back order quantity. Other useful information may include the source of the items to be shipped.

Accounts Receivable (AR) Invoice: a unique invoice identifier, a unique customer identifier (this may be an element of the invoice identifier), a quantity of items, a date, and an accumulation of prices for the items. This document will frequently incorporate freight and shipping charges, and carry a total accumulation for items and other charges;

Accounts Receivable (AR) Payment: a unique payment identifier, a date, an amount, and an accounts receivable invoice identifier.

General Ledger Account Category: at least one unique general ledger account category. Typically, categories will include assets, liabilities, shareholder's equity, revenue from sales, expenses and cost of goods sold;

General Ledger Account: a unique account identifier, and a general ledger account category;

General Ledger Account posting: a unique posting identifier, a general ledger account, and an amount;

General Journal Entry: a unique general journal entry identifier, a general journal identifier, an amount and a date;

Accounts Payable Sub Ledger: a unique AP sub-ledger identifier, and a general journal identifier;

Accounts Payable (AP) Invoice: unique AP invoice identifier, a unique vendor identifier, at least one item, a quantity, at least one price, and a date;

Accounts Payable (AP) Payment: a unique payment identifier, a date, an amount, and an AP invoice identifier.

Accounts Receivable (AR) Sub-Ledger: a unique AR sub-ledger identifier, and a general journal identifier;

Payroll Sub-Ledger: a unique payroll sub-ledger identifier, and a general journal identifier;

Order Costing Sub Ledger: a unique order costing sub-ledger identifier, and a general journal identifier;

Vendor: a unique vendor identifier;

Purchase Order: a unique vendor identifier, a unique purchase order identifier, at least one item, and a pricing scheme;

Purchase Order Item Release: a unique purchase order identifier, at least one item, and an indication of time;

Receiver: a receiver identifier, a vendor identifier, at least one item, a quantity of the item(s), and a date. Some documents will include the name of the individual accepting receipt.

A "representation of a sub-document" means a computer memory storing at least the minimal amount of information needed for a sub-document. In one embodiment the information is stored within containers. While a virtually unlimited number of sub-documents exist within any given business setting, the minimal information for some exemplar sub-documents within an ERP setting is defined:

Quote Item: a unique item identifier and a quote identifier, other information that may be listed includes need date and pricing information;

Sales Order Item: a unique item identifier and a sales order identifier;

Shipper Item: a unique item identifier and a shipper identifier;

Purchase Order Item: a unique item identifier and a purchase order identifier;

Receiver Item: a unique item identifier and a receiver identifier;

Accounts Receivable (AR) Invoice Item: a unique item identifier and an invoice identifier;

Accounts Payable (AP) Invoice Item: a unique item identifier and an AP invoice identifier.

Overview

The present invention relates to a quick and informative interface means for presentation of, and navigation through, stored information from different business documents. The invention allows a user to navigate through the information utilizing a means for displaying an hierarchical tree structure reflecting relationships between different types of business documents.

The present invention creates a hierarchical tree structure by defining relationships between different types of business documents as they are encountered in a typical business environment. While the present invention is not restricted to an ERP setting, typical "types" of business documents within an ERP setting include, but are not limited to, quotes, sales orders, customers, job orders, shippers, invoices (AR and AP), BOMs, routing steps, releases, payments (AR and AP), vendors, purchase orders, receivers, GL account categories, GL accounts, GL account postings, GL entries, AP sub-ledgers, AR sub-ledgers, payroll sub-ledgers, and order costing sub-ledgers. In other settings, other variations of documents would be encountered. For example, in a health services setting, the documents may include x-ray negatives, office visit documentation, health insurance provider information, health history, and prescription drug history. Other documents in the above settings and other business settings will be obvious to those skilled in the art, and are within the scope of the present invention.

The documents are displayed to the user, in the preferred embodiment, so as to indicate in a visual manner, the relationship that exists between the documents, as will be defined below. This is accomplished by means of levels and branches, wherein entries within a branch have the same basis, such as the same customer or the same sales order, while entries in the same level will all be of the same type, such as all customers, or all quotes.

The hierarchical structure is based upon a dominant-subordinate relationship between adjacent levels. This relationship means that for a given branch, a dominant entry may have one or many entries in an adjacent subordinate branch. However, an entry within a subordinate level will only have one entry in the immediately adjacent dominant level within the same branch. It is important to note that a given entry may exist on more than one branch, while not violating the above relationship. For example, with reference to FIG. 4, one may navigate from customer (level 1) to sales order (level 2) to shipper (level 3), or, from customer (level 1) to shipper (level 2). Navigation is described more fully below. Further, it is possible to have a plurality of levels between two entries of the same branch, while maintaining a dominant-subordinate relationship with respect to the two entries. For instance, in the above example, customer is dominant to shipper, regardless of whether or not one navigates through an intermediate sales order document.

When three entries at three levels within the same branch are considered, the relationship is described as being dominant-subordinate-sub-subordinate. In this case, the dominant-subordinate relationship is as defined above. Further, a dominant-subordinate relationship exists between the subordinate and sub-subordinate entry. As was described above, the relationship between the dominant and sub-subordinate entry would be a dominant-subordinate one. Additionally, as in the dominant-subordinate relationships above, the three entries can be, but need not be, in immediately adjacent levels.

The existence of a particular document entry is symbolized by a document instance node, which can be, but need not be, in the form of an icon. Icons associated with document instance nodes may be, but need not be, of different visual characteristics based on the type of document in conjunction with which they are used. Additionally, the document instance nodes may be, but need not be, grouped under another icon that indicates the type of documents in the particular group. This node is defined as a document type node. As in the case of the document instance nodes, document type nodes may be, but need not be, an icon, having different visual characteristics based on the type of document in conjunction with which the icon is used.

Figure 14:
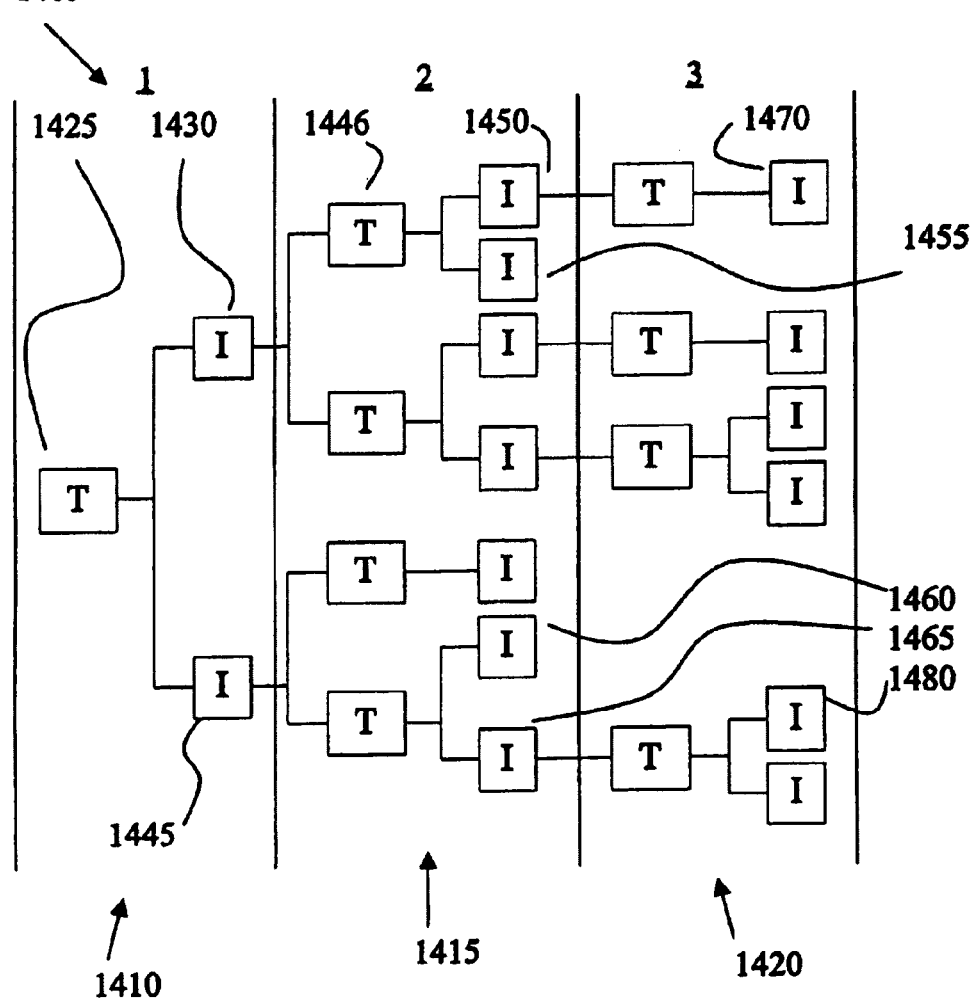
FIG. 14 shows the levels of a branch in a tree structure in which both document type nodes and document instance nodes are used.

Referring to FIG. 14, this is explained. Tree structure 1405 comprises three levels, indicated by columns 1410, 1415, and 1420. Level 1415 is subordinate to level 1410 and dominant to level 1420, and level 1420 is subordinate to both level 1410 and level 1415. Referring to column 1410, one type node 1425 is displayed along with two instance nodes 1430 and 1435. Type nodes 1440 and 1445 are displayed in subordinate level 1415. Instance nodes 1450 and 1455 are of the same type, since both are shown under type node 1440, and both are related and subservient to instance node 1430. Instance nodes 1430, 1450, and 1455 are all in the same branch. Instance nodes 1460 and 1465 are shown under type node 1445. Thus, they are of the same type as type node 1445. While they are subordinate to instance node 1435, and of the same branch as instance node 1435, they are not necessarily related to instance node 1430. Finally, instance nodes 1470 is shown in level 1420. Thus, instance node 1470 would be subordinate to instance nodes 1450 and 1430, but not 1455. Further, instance node 1470 is of the same branch as instance nodes 1450 and 1430, but it is not of the same branch as instance node 1455.

Figure 15:
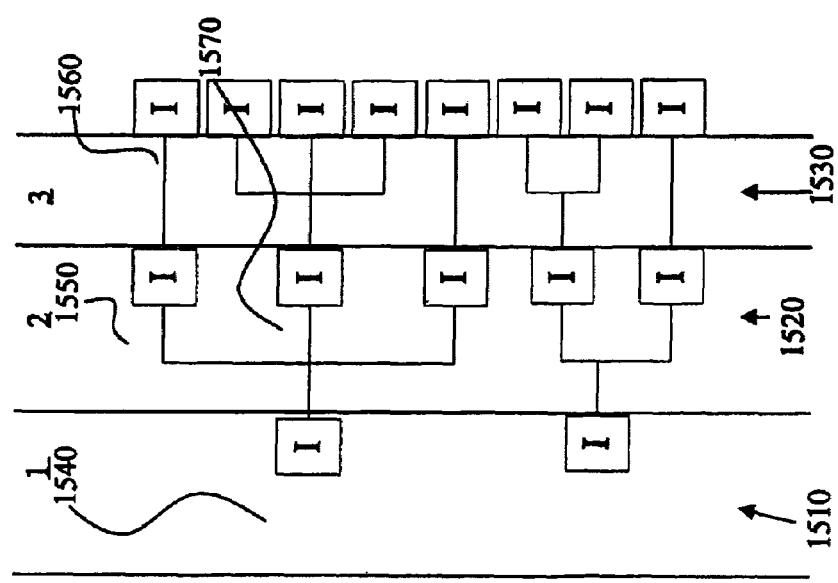
FIG. 15 shows the level of a branch in a tree structure in which only document type nodes and document instance nodes are used.

In one embodiment type nodes are not used in the present invention. A representative tree structure for this embodiment is shown in FIG. 15, which like FIG. 14 displays three levels, 1510, 1520, and 1530. The instance nodes shown in FIG. 15 have the same relationships as the instance nodes in an embodiment incorporating type nodes. Namely, instance node 1550 is subordinate to instance node 1540, and of the same branch as instance node 1540. Instance node 1560 is subordinate to both instance node 1540 and instance node 1550, and of the same branch as instance nodes 1540 and 1550. At the same time, instance node 1570 is subordinate to and of the same branch as instance node 1540, but instance node 1540 is not of the same branch as instance node 1550.

Figure 7:
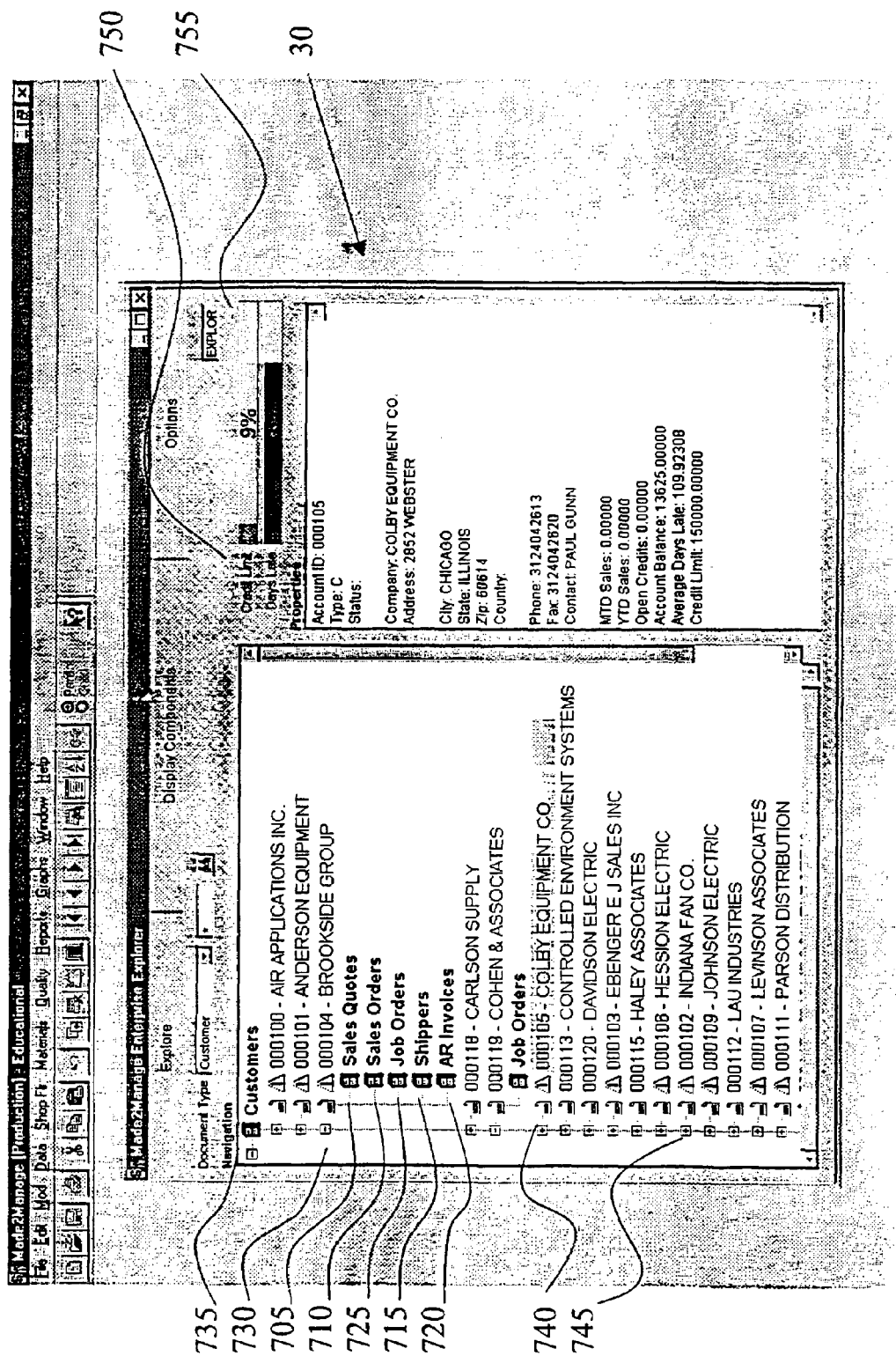
FIG. 7 shows a hierarchical display system in which document type nodes are displayed subordinate to a document instance node for those document types that actually exist for the particular document instance node.

In one embodiment, the user has the option of further filtering document and sub-document instances (which will be described below). The user may define a specific data or group of data as a filter document type node expression or filter sub-document type node expression such that when the expression is met, the document or sub-document in which that data is resident will be shown subordinate to the filtering document type node or filter sub-document type node. For example, a customer document may be presented below a customer document type node as shown in FIG. 7. However, if the user had defined a filtering document type expression for any customer having an outstanding invoice greater than thirty days, and named that filter document type node "Accounts Overdue," and customer 000100—AIR APPLICATIONS INC. did in fact have an invoice which had issued more than thirty days previously that was still outstanding, then customer document 000100—AIR APPLICATIONS INC. would be shown subordinate to "Customers" document type node in addition to "Accounts Overdue" filter document type node. Further, the "Accounts Overdue" filter document type node would be displayed at the same indentation as the document type node "Customers." In this embodiment, the document or sub-document may be displayed alternatively, or redundantly. This does not violate the one-to-one or one-to-many dominant-subordinate relationship defined above in that there is only one instance being referenced. It is merely being redundantly presented to the user. The document and sub-document instance nodes may, but need not, be acted upon and navigated from just as an instance node under a document or sub-document type node.

Figure 16:
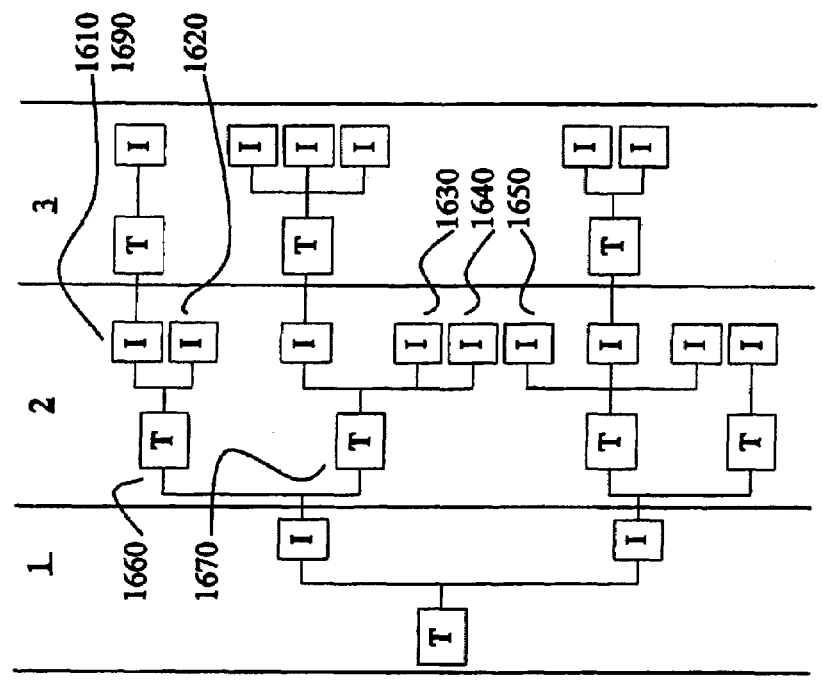
FIG. 16 shows the levels of a branch in a tree structure representative of a filter document type node.
Figure 17:
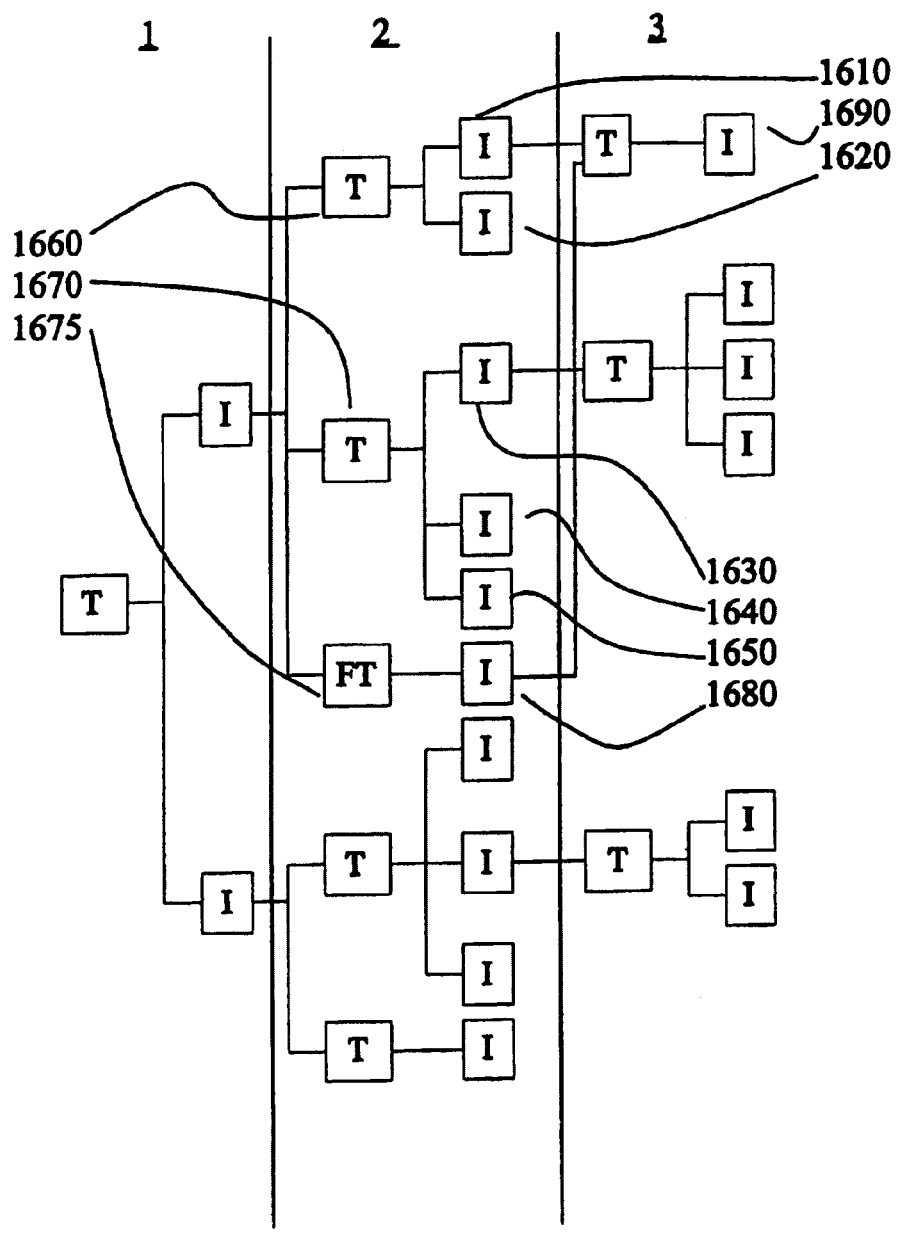
FIG. 17 shows the level of a branch in a tree structure representative of a filter document type node wherein the filter document type node expression has been defined and the logical expression is satisfied.

Referring to FIG. 16, a tree structure with a filter document type node is explained. Instance nodes 1610 and 1620, and 1630, 1640 and 1650 are displayed subordinate to type nodes 1660 and 1670 respectively, indicating relationships defined above. Instance node 1690 is likewise displayed subordinate to instance node 1610. The identical tree is shown in FIG. 17, with the exception that a filter document type node expression has been defined, and instance node 1610 satisfies the logical expression. Consequently, filter document type node 1675 is displayed with instance node 1680 listed underneath. The actual instance associated with instance node 1680 is the same instance that is associated with instance node 1610. Further, expansion of node 1680 and consequent exploration leads to instance node 1690, just as expansion and exploration of instance node 1610 leads to instance 1690. Thus, instance node 1680 is in all functional respects identical to instance node 1610.

Document instance nodes are associated with stored computer memory comprising representations of business documents. Thus, each instance node may be thought of as being associated with a specific document. Although each node has a discrete set of information associated with the node, the specific information contained within the computer memory may be, but need not be, defined as part of more than one document.

The displayed hierarchical tree structure of the present invention is based upon entry points. An entry point is a document that the user designates as the highest-level for a tree. The invention in the preferred embodiment defines a variety of potential entry points based on the normal flow of business documents in an ERP setting, the varieties of analysis that a business performs, and the specialized knowledge that can be expected within the different business groups of an enterprise. For example, in the scenario where a salesperson is visiting Customer B and Customer B has reason to know what quotes had been provided to Customer A, the salesperson would be interested in obtaining the quotes given to Customer A. Thus, the invention defines a customer document as an entry point and, as will be explained more fully below, the invention provides a means for navigating from a particular customer document (entry point) to the quote documents (subordinate documents) associated with that customer.

While the above example shows arrival at a specific quote from a customer document entry point, it is sometimes useful to enter the system by way of another entry point while accessing the same type of document. For instance, if one is tracking sales history and desires to understand seasonal variability, it is more useful to look directly at sales order documents generally rather than being limited to those of a specific customer. Thus, it is more convenient to look directly to sales order documents, rather than navigating through customer documents, thereby avoiding the extraneous level as well as not over constraining the documents available for exploration. Finally, a sales representative would be knowledgeable as to specific quotes and sales orders. A production manager would be familiar with particular job orders. The shipping department would have special interest in shipping activity, and accounting department personnel would be interested in invoices. Therefore, in the preferred embodiment of the invention, those documents, among others, are designated as entry points. Other entry points or groupings of entry points will be obvious to those skilled in the art as being appropriate for specific applications, those entry points and groupings of entry points are within the scope of the present invention.

Navigation from an entry point in the present invention is effected once a node of interest is selected with means for selecting a node. In one embodiment, means for selecting a node comprises an interface of a cursor controlled by a mouse. Navigation from the entry point is then accomplished by moving the cursor to the desired node and double clicking, or by right clicking the mouse, which causes a menu to appear, and choosing an explore option. Either action may cause nodes subordinate to the selected node to alternately be expanded or collapsed. Once a subordinate node is exposed, repeating the above sequence with the desired subordinate node may further expand the branch. In one embodiment, the above operation can be performed on instance nodes subordinate to document and sub-document type nodes as well as on instances subordinate to filter document and sub-document type nodes.

The invention further allows navigation through certain sub-documents, using the sub-document as a bridge between documents of different types. This is useful particularly in the case of line items. For example, a single sales order comprises several line items. Each of the line items has the potential for spawning several job-orders. Thus, it is less confusing to a user to differentiate job orders according to the line item they are associated with, rather than presenting all the job orders related to a sales order. Consequently, the present invention comprises representations of sub-documents, sub-document instance nodes, sub-document type nodes, and filter sub-document type nodes having the same system characteristics as representations of documents, sub-document instance nodes, sub-document type nodes, and filter document type nodes, respectively.

The allowed paths are displayed to the user as branches that may be alternatively investigated from a given entry point or root. The entry point chosen by the user may be represented as the root level of the document tree, and is dominant to the subordinate document or sub-document, which may be navigated to directly from the root level. In one embodiment, subordinate levels are displayed as an indented list immediately below the entry point. While the branch level is in a subordinate relationship to the root level, as a given branch is explored, the branch becomes a dominant level to ensuing branches that are listed below the explored branch. Finally it should be noted that in the preferred embodiment only a single type of document is displayed at the top level (the "root") of the tree. Alternate embodiments permit multiple entry points to be shown at the top level. One embodiment allows multiple instance nodes for the same business document or subdocument. Specifically, this is allowed when an instance has a filter document type node expression defined. In this scenario, if the expression is satisfied, the instance has a document instance node displayed subordinate both to the document type node as well as to the filter document type node.

Navigation paths in the present invention are defined by relationships between the different documents and sub-documents. In the preferred embodiment, the means for relating documents and or sub-documents is a key. A key will uniquely identify one container. This is the primary key for the container. For example, a customer container may have a primary key of 1001. If a container representing a sales order document is created which will relate to 1001, the container will incorporate customer no. 1001 as a foreign key, while being uniquely identified by its own primary key, SO2002, for example.

In navigating to a particular document or sub-document in the preferred embodiment, the following principles apply. First, the document or subdocument to be navigated to (subordinate) must be of a type to which navigation is allowed as defined by the keys that relate documents to each other. Second, the container representing the subordinate document or sub-document must have, as a foreign field, the key which is present as a primary key in the dominant document or sub-document. Third, in any dominant-subordinate relationship, the subordinate document or sub-document must incorporate as a foreign key, any foreign key that was used in order to navigate to its immediately dominant document or sub-document. Applying this to the above example, since navigation is allowed from a customer document to a sales order document, as will be described below, the first principle is satisfied. When container SO2002 was defined, it incorporated as a foreign field the primary key of the customer who made the order, in this example, 1001. Thus the second principle is satisfied. Since only two levels are involved, the third principle is met when the second principle is met. The third principle differs from the second principle when the user further explores the branch, SO2002. For example, if the job order had been completed, and the product shipped, a shipper document, SH3003 would have been created. SH3003 would be the primary key, while 1001 and SO2002 would be foreign keys for SH3003. Thus, continuing the above example, the user would be allowed to navigate to SH3003 since navigation is allowed from a job order to a shipper, SH3003 has SO2002 as a foreign key, and SO2002 has 1001 as a foreign key. It is important to note that the navigation is not dependent on the type nodes in this embodiment. Thus, the existence of more than one associated node for a given instance within the same level, such as may occur in an embodiment comprising filter document and sub-document type nodes, has no effect on the navigation provided by the present invention.

The present invention also incorporates layers, such that immediately adjacent subordinate levels may, but need not, comprise component documents or layers of the dominant document. Consider the following example. A quote document comprises an automobile, while quote item sub-documents comprise a power package and a sound package. However, the sound package may, but need not, include a remote CD player. Therefore, the sub-document representing a CD player option comprises a sub-layer quote item sub-document. Continuing this example, the remote CD player routing step document would include installation of the remote unit in the trunk. As a sub-layer to the associated routing step document, the running of wire from the remote unit to the local unit would be represented by a sub-layer routing step document. As the above example demonstrates, both documents and sub-documents can be layered.

The present invention further comprises means for defining the information, related to the representation of a business document or subdocument, which will be displayed when a document instance node is selected. The information that is identified by the user is then displayed when the associated instance node is selected. Using an ERP setting as an example, any information within the ERP system may be identified for display. While the information will predominantly comprise data from the selected document or sub-document, a user may identify information not normally associated with the document or sub-document. For example, a sales person interested in displaying information regarding outstanding sales orders for one customer, while interested only in the available credit for another customer, could identify this information for the individual customer such that as the customer documents are selected by the sales person, this information is displayed. In the preferred embodiment, the information is displayed to the user adjacent a user defined label such as, but not limited to, "Days Late".

In one embodiment, each individual user defines the information according to their particular job needs, and this identification of information is stored within the system during the computer session. The information is also maintained by the system between sessions, available to be recalled whenever the user accesses the system and selects the applicable node. In an alternate embodiment, users are grouped into user classes, sometimes referred to as "roles", that have common information needs. For example, shipping clerks may all be defined as a single user class, while the president of a company may be the sole member of a user class. The unique identification of users and or groups of users and storage of user unique information are well known in the art.

The invention comprises a means for displaying the information so designated. The means for displaying information includes but is not limited to a pane within a window.

The invention also allows information within the system to be evaluated, and the results displayed graphically. This is accomplished by providing points of interest and visual progress bars. As in the case of the information to be displayed, the point of interest in the preferred embodiment is user definable, and stored and maintained within the system. The user defines a point of interest expression that is in the form of a logical expression, which resolves to true or not true. The system assesses the underlying information and results are then displayed to the user by a means for displaying a point of interest. In the preferred embodiment, the display is in the form of an icon that appears when the expression evaluates to true, and is displayed next to the instance node for which the expression is defined.

A visual progress bar, in one embodiment, is also user definable, and stored and maintained within the system. The displayed visual progress bar is also based upon an expression. The expression for a visual progress bar is in the form of X/Y, and attains a maximum value of one (1). The system computes a value based on the underlying information and results are then displayed to the user by a means for displaying a visual progress bar. In the preferred embodiment, the display is in the form of a progress bar and text.

The present invention further comprises a means for accessing the representation of a business document that is being displayed. In the preferred embodiment, a means for launching the accessing means is further provided. In the preferred embodiment, the accessing means allows the user to view or edit the representation of a business document. Consequently, a user may edit the representation of a business document by right clicking on the document instance node associated with the representation of a business document. In the preferred embodiment, editing comprises capabilities such as adding, deleting, and altering.

A means for limiting the nodes displayed to a user is also provided. This should not be confused with the function of filtering document and sub-document type nodes described above. The means for limiting displayed nodes in the preferred embodiment comprises a filter text box, into which letters, numbers and wildcards may be placed to limit the nodes displayed by the invention, including those displayed subordinate to filter document and sub-document type nodes.

The invention also comprises a means for launching the navigational software which may be imbedded into the system software, such that while a user is using an interface for displaying information in a representation of a business document, the user may launch the navigational software from that interface. In the preferred embodiment, the navigational software places a node associated with the representation of a business document that was being viewed as the root for the hierarchical tree structure.

Figure 4:
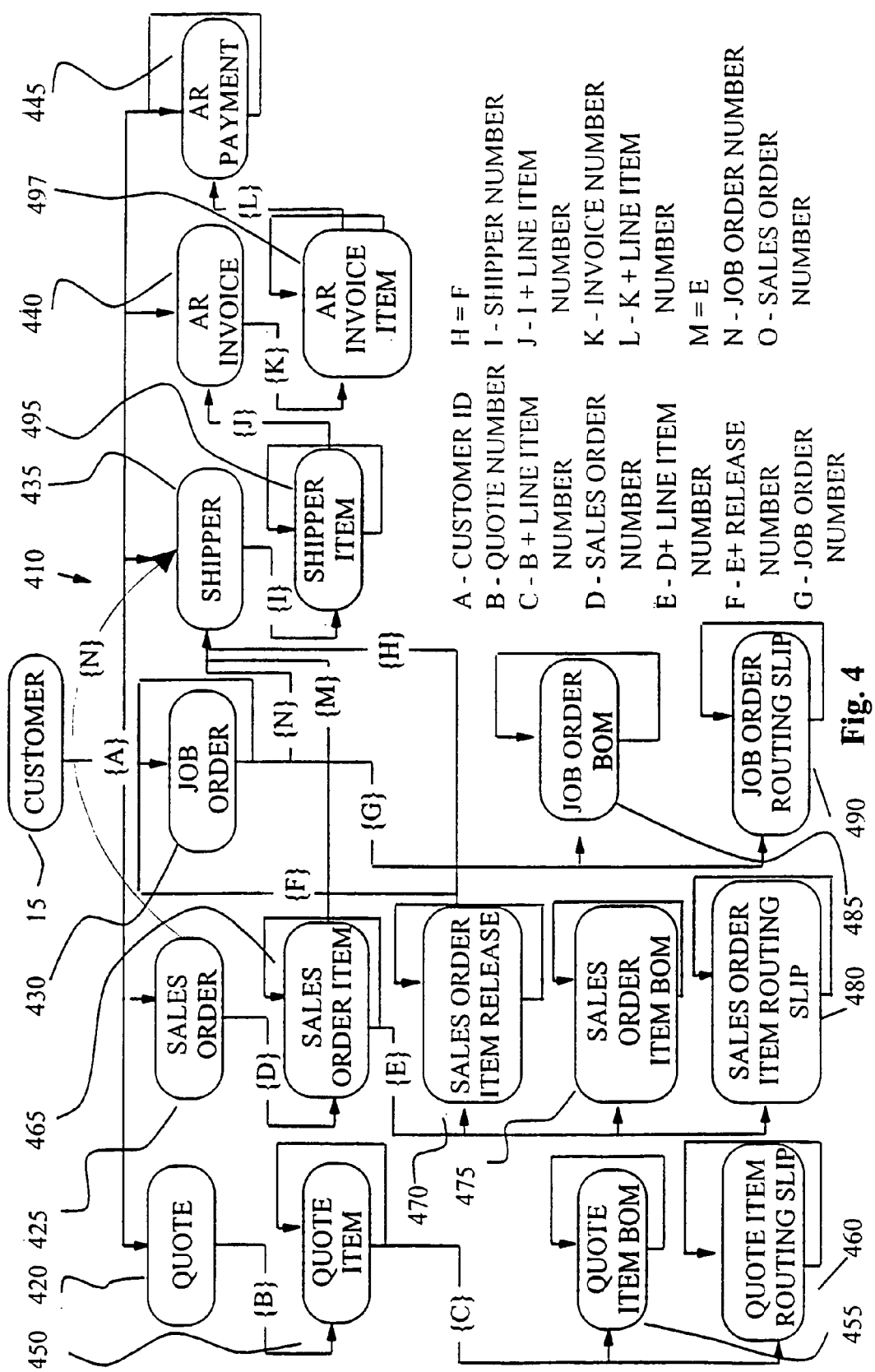
FIG. 4 shows an exemplary hierarchical relationships between demand business documents and subdocuments.
Figure 5:
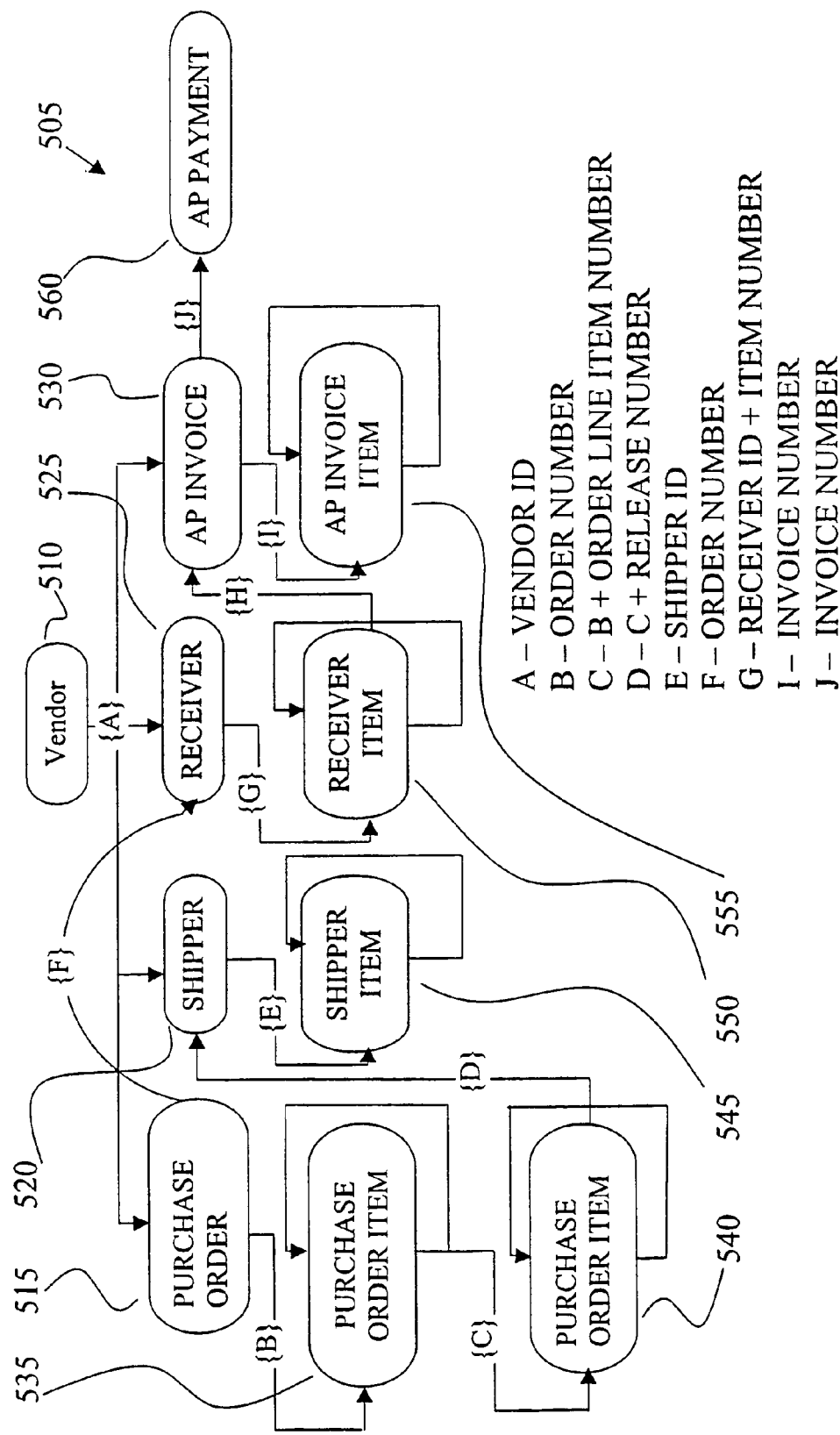
FIG. 5 shows an exemplary hierarchical relationships between supply business documents and subdocuments.
Figure 6:
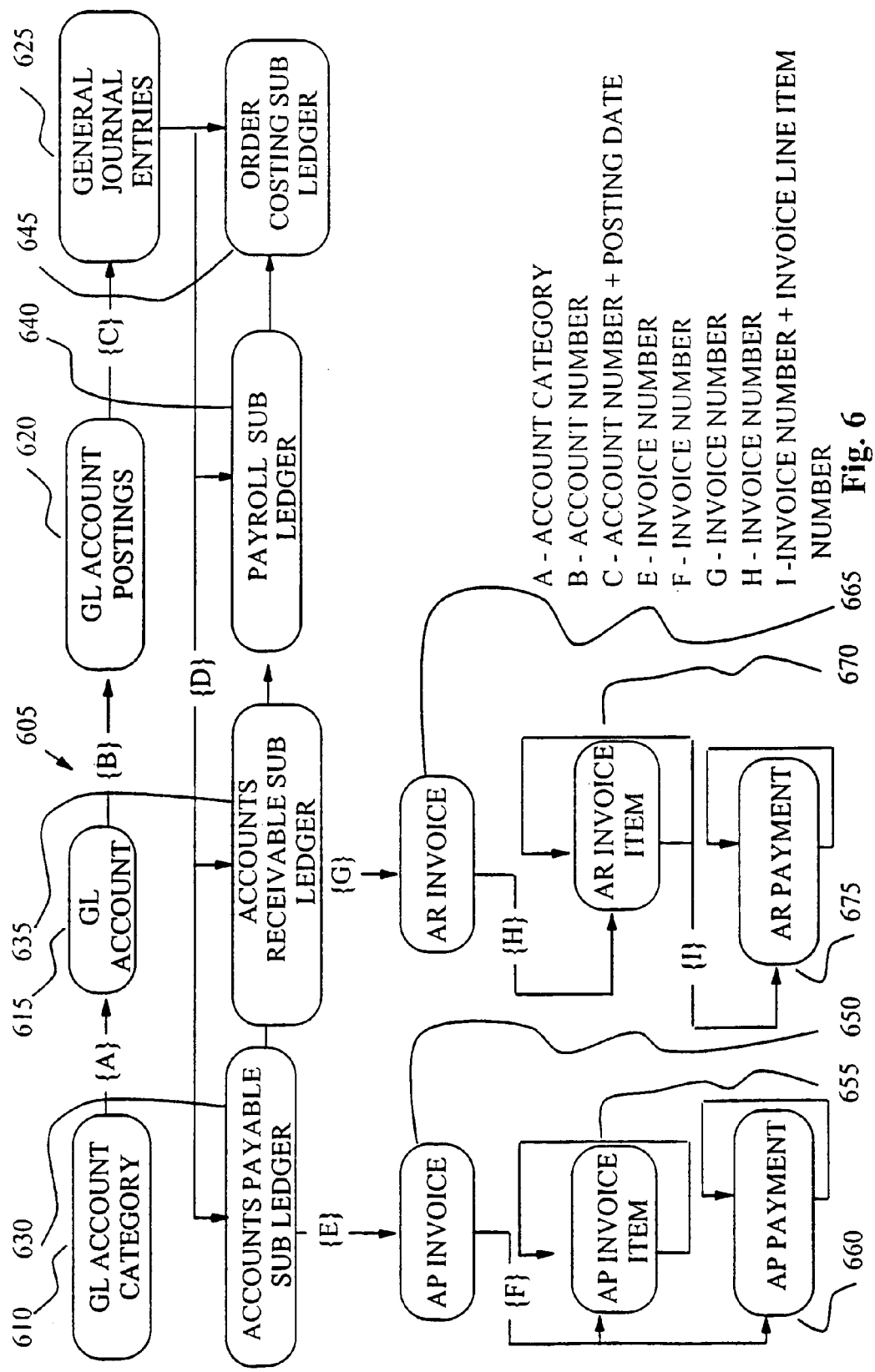
FIG. 6 shows an exemplary hierarchical relationships between general ledger business documents and subdocuments.

Description of Relationships Between Documents Using the example of an ERP setting, representative paths for navigating between business documents are shown in FIGS. 4, 5 and 6, which respectively describe supply, demand and general ledger documents. Typical "types" of business documents within the ERP setting comprise, but is not limited to, quotes, sales orders, customers, job orders, shippers, invoices (AR and AP), BOMs, routing steps, releases, payments (AR and AP), vendors, purchase orders, receivers, GL account categories, GL accounts, GL account postings, GL entries, AP sub-ledgers, AR sub-ledgers, payroll sub-ledgers, and order costing sub-ledgers.

Referring to FIG. 4, demand-side state machine 410 is described. Customer document 415 comprises the highest-level entry point of demand-side state machine 410. The usefulness of entering at customer document 415 is described above. Quote 420, sales order 425, job order 430, shipper 435, and AR invoice 440 also comprise entry points for demand-side state machine 410, such that a user may navigate using these entry points as the root level of the tree. It is useful to enter at quote documents 420 in order to perform business analysis. For instance, in assessing the appropriateness of a product's price, a salesperson may want to know if an item has been quoted frequently, but rarely sold. This might indicate that the product is overpriced. Conversely, if every quote results in an order, perhaps the item is under priced. The usefulness of entering at sales order 425 was presented above. A Production manager who wants to know the status of backlogs would desire to enter straight into job orders 430, not being immediately interested in the particular customers affected. Further, the production manager would be able to see all the open orders that are yet to be addressed by manufacturing. An individual that is in the shipping department might know that they are sending a shipment to a particular organization, but not the specific items or quantities to be shipped. This individual would be interested in entering at shipper document 435 of demand-side state machine 410 and drilling down to find the specific information.

Referring still to FIG. 4, the allowed navigation paths of the preferred embodiment are described. From customer document 415, direct navigation is possible to quote document 420, sales order document 425, job order document 430, shipper document 435 of demand-side state machine 410, AR invoice document 440, or AR payment document 445.

Customer Related Documents

Moving from customer document 415 to quote document 420 is useful when a salesperson is attempting to ascertain quotes given to a particular customer as has previously been discussed. Moving from customer document 415 to sales order document 425 is useful for understanding the purchase history of a particular customer. A salesperson may use this to ascertain when the next call to a customer should be made. A salesperson may navigate from customer document 415 to job order 430 if a customer has recently had a fire and can not receive any products. The salesperson can rapidly ascertain job order documents 430, representing work in progress, under customer document 415 and put them on hold.

Navigation from customer document 415 to shipper document 435 of demand-side state machine 410 is useful when the customer represented by customer document 415 inquires as to the status of a shipment that is late. The user enters the system at customer document 415 and navigates to shipper document 435 of demand-side state machine 410 to determine whether the shipment is in transit or sitting on the loading dock. Similarly, if a customer inquires as to a recently delivered bill, user can enter at customer document 415 and navigate to AR invoice document 440 to ascertain the basis for the billing. The same customer perspective is useful when an issue arises as to what invoice a particular payment was applied to. The AR clerk or manager would enter at customer document 415 and navigate to AR payment document 445 to find the needed information.

Quote Related Documents

Navigation from quote document 420 to quote item sub document 450 by a sales person is useful when a customer desires to know the cost basis of a particular option for a made to order product. Further evaluation of the cost basis of a quote line item is available by navigating to quote item BOM document 455 to ascertain information concerning the sub-components of the line item, or by navigating to quote item routing step 460 to determine the processes which are to be performed on the quote line item, such as customized painting.

Sales Order Related Documents

The chain of documents and sub-documents under a sales order document is very similar to that of the chain under a quote document. The primary difference is that instead of an offer as in the case of the quote, the system provides for a means of displaying information concerning a product or service that has been contracted for. Thus, navigation is provided from sales order document 425 to sales order item sub-document 465 and thence to sales order item BOM document 475 or sales order item routing step document 480. However, since a contract for a specific product has been made, certain additional documents and paths are useful in tracking the progress of the product through the manufacturing stages.

The present invention provides a navigation path from sales order document 425 to shipper document 435 of demand-side state machine 410 so that a salesperson may ascertain the status of a specific order upon inquiry from a customer. To determine the status of a delivery for a customer who has a purchase order comprising a plurality of deliveries throughout a year, navigation from sales order item sub-document 465 to shipper document 435 of demand-side state machine 410 is provided. In cases where the product has not yet been shipped, the actual status of the product can be ascertained by navigating to sales order item release document 470 to determine if the item had been released for production and/or for shipping. From sales order item release document 470, navigation is allowed to either job order document 430, to determine where in production the item is, or to shipper document 435 of demand-side state machine 410 to establish shipping information.

Job Order Related Documents

Navigation from job order document 430 to job order BOM document 485 or job order routing step document 490 is useful in gathering information as to the status of a product which has been released for production. Should the sales person in the above example opt to navigate from sales order item release document 470 to job order document 430 instead of shipper document 435 of demand-side state machine 410, only to discover the work on the product has been completed, navigation is provided to shipper document 435 of demand-side state machine 410 directly from job order document 430.

Shipper Related Documents

Navigation from shipper document 435 of demand-side state machine 410 to shipper item sub-document 495 of demand-side state machine 410 is useful for a shipping manager who knows a shipment is supposed to go to a customer, but does not recall the specific items to be loaded. Navigation from shipper item sub-document 495 of demand-side state machine 410 to AR invoice document 440 is needed when personnel in accounts receivable are attempting to reconcile a global payment from a customer that covers all or parts of several shippers.

AR Invoice Related Documents

Many times a payment will be for less than an entire AR invoice. In these circumstances, the invention allows for navigation from AR invoice document 440 to AR invoice item sub-document 497.

AR Payment Related Documents

In the preferred embodiment, one could navigate to AR payment 45 from customer 415 as described above. Alternatively, navigation is useful, for example, from AR invoice item sub-document 497 to AR payment document 445, for accounts receivable personnel rectifying payments received against a specific AR invoice.

While the above examples provided a simple scenario showing the usefulness of the entry points and navigational paths for the preferred embodiment, many other reasons for the chosen paths and entry points exist. Further, many persons in addition to those discussed may be interested in the entry points and navigational paths for varying reasons. Additional entry points and paths are possible, said entry points and paths being within the scope of the present invention.

Supply Related Documents Entry Points

Referring now to FIG. 5, supply side state machine 505 is explained. Vendor document 510 comprises the highest-level entry point for supply side state machine 505. A production manager may desire to begin a tree at the vendor document level in order to if it is known that a product has been shipped to a particular sub-contractor, but the purchase order number is not known. In addition to vendor document 510, purchase order document 515, shipper document 520 of supply side state machine 505 receiver document 525 and AP invoice document 530 are provided as entry points in the preferred embodiment. A salesperson receiving an inquiry as to the meaning of a specific purchase order item may be given a purchase order number as a reference and enter at purchase order document 515. The same salesperson may use a number or receiver number in asking the shipping clerk whether a product is sitting on the loading dock. Therefore, the shipping clerk would enter the navigation tree at shipper document 520 of supply side state machine 505 or receiver document 525 respectively. An accounts payable clerk may be given an invoice number when asked about the status of paying a vendor, thus entering the tree at AP invoice document 530. Consequently, the preferred embodiment has defined the above entry points to minimize the navigation required to obtain the desired information.

Vendor Related Documents

Continuing with FIG. 5, navigation paths through supply side state machine 505 are defined. Navigation from vendor document 510 to purchase order document 515 is of use in several instances. One example is for accounts payable personnel attempting to determine the number of open orders that exist for a given vendor. Navigation from vendor document 510 to shipper document 520 of supply side state machine 505 is useful for a sales person desiring information on the status of a product that has sub-contract work to be performed on the product. Navigation from vendor document 510 to receiver document 525 is useful for determining if the product has returned from the sub-contractor. Navigation from vendor document 510 to AP invoice document 530 is useful for a manager interested in performing a price comparison between vendors.

Purchase Order Related Documents

Navigation is provided from purchase order document 515 to purchase order item sub-document 535 and thence to purchase order item release document 540, which is useful for determining the status of sub-contracting work which is done in support of a contract of the type discussed under sales order item release document 470 of demand state machine 410 of FIG. 4. Thus, a salesperson investigating a late delivery can ascertain whether the shipment to the sub-contractor has been released. Continuing this example, navigation from purchase order document 515 or purchase order item release document 540 to shipper 520 of supply side state machine 505 allows a salesperson to determine if the product has been shipped to the vendor for the sub-contracted work to be performed. Navigation from purchase order document 515 to receiver document 525 is useful in determining if the product has been returned from the vendor.

Shipper Related Documents

Navigation from shipper document 520 of supply side state machine 505 to shipper item sub-document 545 of supply side state machine 505 allows a user to view the specific items comprising shipper 520 of supply side state machine 505. This is useful for a clerk inventorying the products that have been shipped to a sub-contractor.

Receiver Related Documents

Navigation from receiver document 525 to receiver item sub-document 550 is useful for ascertaining the specific items that were received from a sub-contractor. In conjunction with shipper item sub-document 545 of supply side state machine 505, this allows a complete inventory of items at a sub-contractor to be determined. Navigation from receiver item sub-document 550 to AP invoice document 530 is useful for accounts payable personnel in determining whether an invoice for a particular item has been received.

AP Invoice Related Documents

Navigation from AP invoice document 530 to AP invoice item sub-document 555 is useful in determining the specific items that are being billed under AP invoice document 530. Navigation from AP invoice document 530 to AP payment document 560 is useful in determining the status of paying vendors for work performed.

GL Related Documents

Referring now to FIG. 6, GL drill-down state machine 605 is explained. The highest level entry point for GL drill-down state machine 605 is GL account category document 610. This entry point is provided for users who are not familiar with the various accounts in the general ledger, so as to be an aid in determining an exploration path. The other entry point in GL drill-down state machine 605 is GL account document 615 which is useful for experienced users who know the account they are interested in.

Continuing with FIG. 6, navigation paths of GL drill-down state machine 605 are described. Navigation from GL account category document 610 to GL account document 615 is used to begin focus on a specific GL account, such as but not limited to assets, liabilities, and shareholders' equity. Navigation from GL account document 615 to GL account postings document 620 is useful for viewing cash flow within a specific account without the confusion of daily fluctuations. Navigation from GL account postings document 620 to general journal entries sub-document 625 is useful in focusing on activity on a daily basis, allowing analysis of trend lines for any account in any account category. Navigation from general journal entries sub-document 625 to the ledgers comprising the entry allows for increased focused on the ledgers which is useful, for example, in performing cost analysis. In the preferred embodiment, the ledgers comprise AP sub-ledger document 630, AR sub-ledger document 635, payroll sub-ledger document 640, and order costing sub-ledger document 645.

The information within the aforementioned documents within this state machine comprises compiled information. The relationship between the compilation information and the primary instances is captured by navigation from AP sub-ledger document 630 and AR sub-ledger document 635, to AP invoice document 650 and AR invoice document 665 respectively. AP invoice document 650, AP invoice item sub-document 655, and AP payment document 660 are the same containers as AP invoice document 530, AP invoice item sub-document 555, and AP payment document 560 of FIG. 5. AR invoice document 665, AR invoice item sub-document 670, and AR payment document 675 of GL drill-down state machine 605 in the preferred embodiment are the same containers as AR invoice document 440, AR invoice item sub-document 497, and AR payment document 445 of supply-side state machine 410 shown in FIG. 4.

Those of skill in the art will appreciate that in one embodiment of the invention described above, each hierarchy level includes two nodes: a document type node, and a document instance node. For example, the following table illustrates, the node type and hierarchy level numbers for a representative set of records:

| Description | Node Type | Level |
|---|---|---|
| Customers | Document type node | 1 |
| customer 1 | Document instance node | 1 |
| quotes | Document type node | 2 |
| quote 1 | Document instance node | 2 |
| quote line items | Document type node | 3 |
| quote line item 1 | Document instance node | 3 |
| quote line item 2 | Document instance node | 3 |
| quote 2 | Document instance node | 2 |
| quote line items | Document type node | 3 |
| quote line item 1 | Document instance node | 3 |
| quote line item 2 | Document instance node | 3 |

-continued

| Description | Node Type | Level |
|---|---|---|
| sales orders | Document type node | 2 |
| sales order 1 | Document instance node | 2 |
| sales order line items | Document type node | 3 |
| sales order line item 1 | Document instance node | 3 |
| sales order line item 2 | Document instance node | 3 |
| sales order 2 | Document instance node | 2 |
| sales order line items | Document type node | 3 |
| sales order line item 1 | Document instance node | 3 |
| sales order line item 2 | Document instance node | 3 |
| job orders | Document type node | 2 |
| job order 1 | Document instance node | 2 |
| job order 2 | Document instance node | 2 |
| customer 2 | Document instance node | 1 |
| sales orders | Document type node | 2 |
| sales order 1 | Document instance node | 2 |
| sales order line items | Document type node | 3 |
| sales order line item 1 | Document instance node | 3 |
| sales order line item 2 | Document instance node | 3 |
| sales order 2 | Document instance node | 3 |
| sales order line items | Document type node | 3 |
| sales order line item 1 | Document instance node | 3 |
| sales order line item 2 | Document instance node | 3 |
| job orders | Document type node | 2 |
| job order 1 | Document instance node | 2 |
| job order 2 | Document instance node | 2 |

However those of skill in the art will appreciate that the document type nodes are optional, as they are not necessarily needed to display information from a particular business document. Accordingly, the document type nodes may be eliminated entirely from the levels of each hierarchy. In such a system, for example, the above representative hierarchy could be displayed as follows.

| Description | Node Type | Level |
|---|---|---|
| customer 1 | Document instance node | 1 |
| quote 1 | Document instance node | 2 |
| quote line item 1 | Document instance node | 3 |
| quote line item 2 | Document instance node | 3 |
| quote 2 | Document instance node | 2 |
| quote line item 1 | Document instance node | 3 |
| quote line item 2 | Document instance node | 3 |
| sales order 1 | Document instance node | 2 |
| sales order line item 1 | Document instance node | 3 |
| sales order line item 2 | Document instance node | 3 |
| sales order 2 | Document instance node | 2 |
| sales order line item 1 | Document instance node | 3 |
| sales order line item 2 | Document instance node | 3 |
| job order 1 | Document instance node | 2 |
| job order 2 | Document instance node | 2 |
| customer 2 | Document instance node | 1 |
| sales order 1 | Document instance node | 2 |
| sales order line item 1 | Document instance node | 3 |
| sales order line item 2 | Document instance node | 3 |
| sales order 2 | Document instance node | 2 |
| sales order line item 1 | Document instance node | 3 |
| sales order line item 2 | Document instance node | 3 |
| job order 1 | Document instance node | 2 |
| job order 2 | Document instance node | 2 |

In such an embodiment, a child business document in a hierarchy may be expanded or collapsed by, for example, double clicking on the parent business document.

The machines in the preferred embodiment define a set of paths and entry points that will be useful in a wide variety of applications. It will be obvious to those skilled in the art that virtually any navigational path between documents can be programmed into a system, and the present invention includes within its scope alternate entry points and or paths that may be defined for an application. The salient feature being that navigation between documents and/or sub-documents of different types is allowed.

User Interface

Referring now to FIG. 1, the preferred embodiment of the invention is described. Explore tab 10 contains the primary visual objects that the user interacts with when locating or reviewing information. Explore tab 10 comprises the means for displaying a hierarchical tree structure shown by navigation pane 20, and the means for displaying information embodied as properties pane 30. As is well known in the art, the relative sizes of the panes may be adjusted by placing the mouse cursor (not shown) between the two at or about dashed line 25 and then clicking and dragging the mouse to yield the desired proportion.

By activating drop down combo box 40 of explore tab 10, a list of document types is displayed in text box 41. This list is limited to documents that are entry points. In the preferred embodiment, sub-documents are not entry points. The documents which are entry points include customer, quote, sales order, job order, shipper, AR invoice, vendor, purchase order, receiver, AP invoice, G/L account category, and G/L documents. Choosing a specific document type causes text box 50 to resize, according to the selection made, and that control receives focus. Text box 50 displays unique document identifiers, allowing the user to specify a particular document from which tree view control 60 is refreshed. Lookup capability is associated with this control through binocular button 70. Although all derivation of related documents is performed via the unique document identifier, a user can, at any time, activate locator 80 to provide support for other search criteria such as name, date, etc. In addition to a specific search criterion within text box 50, wildcarding can be used, for example, '*'=match zero or more, and '?'=match one.

Continuing with FIG. 1, below drop down combo box 40, and occupying navigation pane 20 of explore tab 10, is tree view control 60, which is a hierarchical tree structure of document instance and type nodes. In the preferred embodiment, tree view control 60 is a commercially available control such as can be provided by Sheridan Software Systems, Inc. of Melville N.Y., which is discussed in more detail below. Tree view control 60 contains the result of the current search criterion of locator 80, combo box 40, or text box 50. Tree view control 60 contents are not removed until a new search criterion is specified. It is via tree view control 60 that the user navigates to related documents or sub-documents, initiates further exploration from, and receives certain visual feed back pertaining to the state of a document.

There are two primary node categories (or lines) that appear in tree view control 60, type nodes such as type nodes 80, 81, 82, 83, and 84, and instance nodes such as instance nodes 90, 91, 92, 93, 94, 95, and 96. More specifically, type nodes 80, 82, 83, and 84 are document type nodes, which indicate that the documents listed underneath the nodes are of the same type. For example, under Bill of Material (BOM) document type node 84, BOM document instance nodes 94, 95, and 96 are listed. Document instance nodes, such as document instance nodes 90, 92, 93, 94, 95, and 96 identify a specific instance of a document.

Also shown in tree view control 60 are sub-document type node 81 and sub-document instance node 91. These nodes function in the same manner as document type nodes and document instance nodes. However, the nodes are associated with subsets of a document such as the specific line items in a sales order as represented by sub-document instance node 91.

Figure 8:
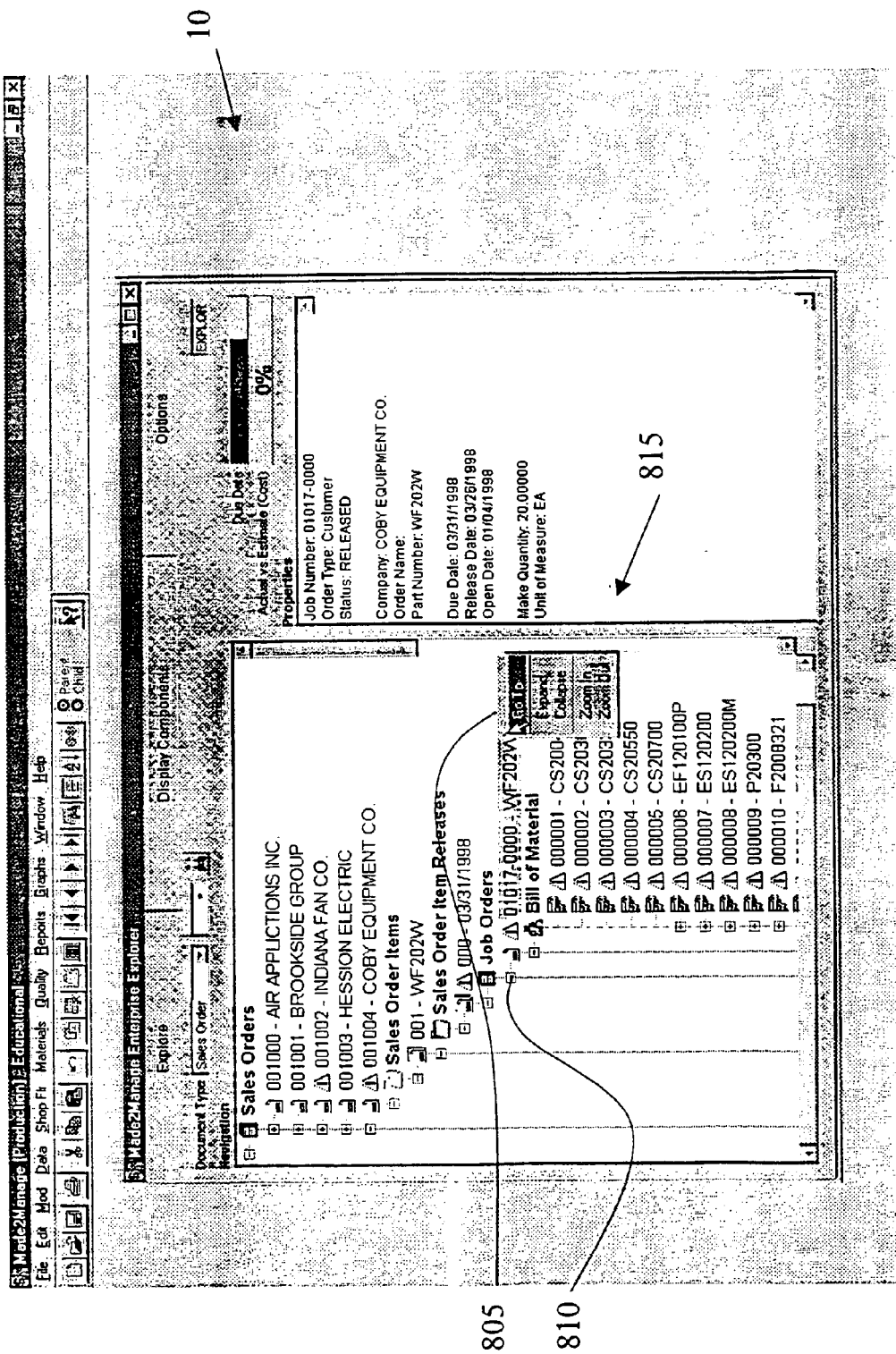
FIG. 8 shows a pop-up box that permits an accessing screen for a particular business document (or sub-document) to be launched directly from the hierarchical tree structure.
Figures 10, 11:
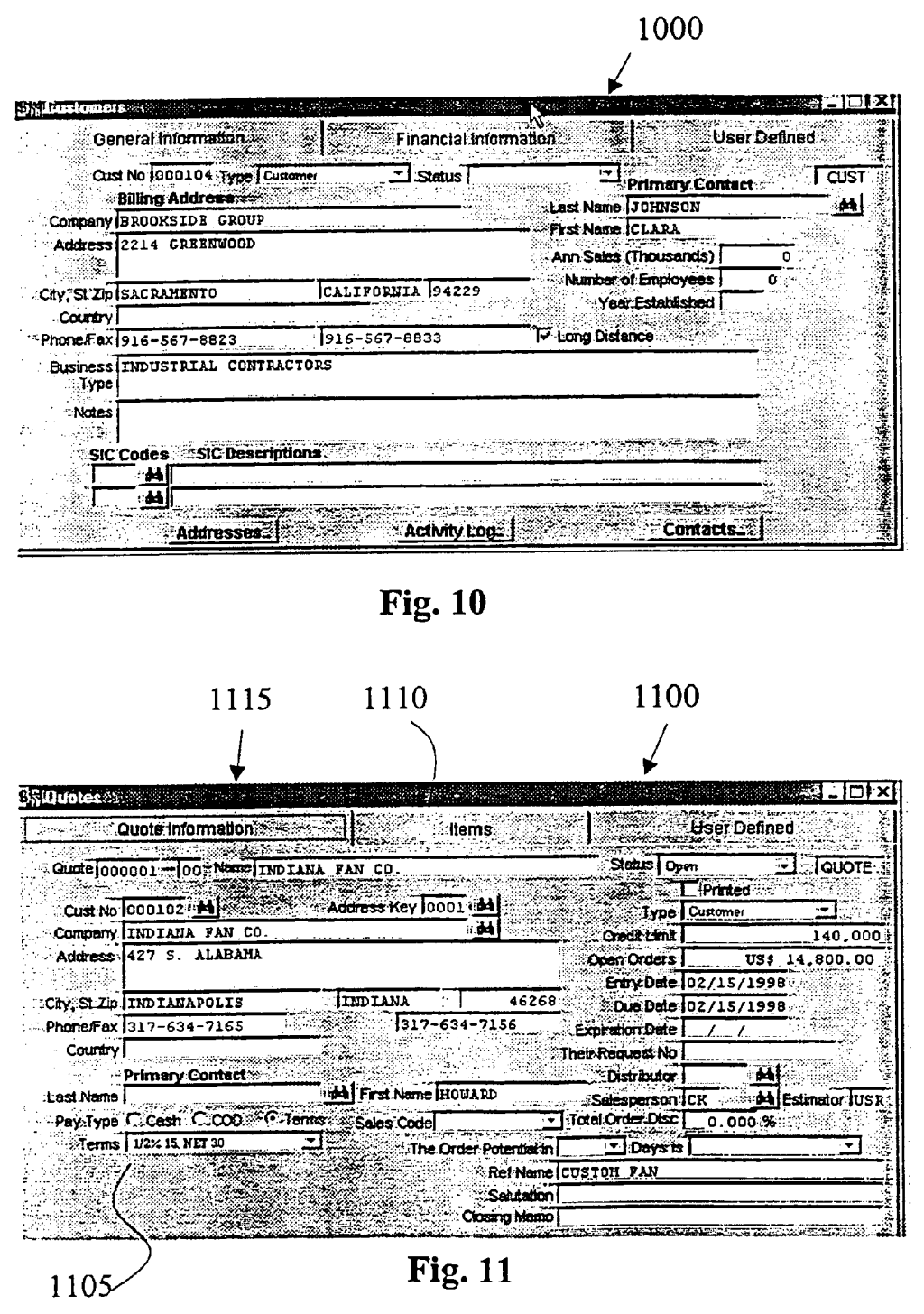
Figure 12:
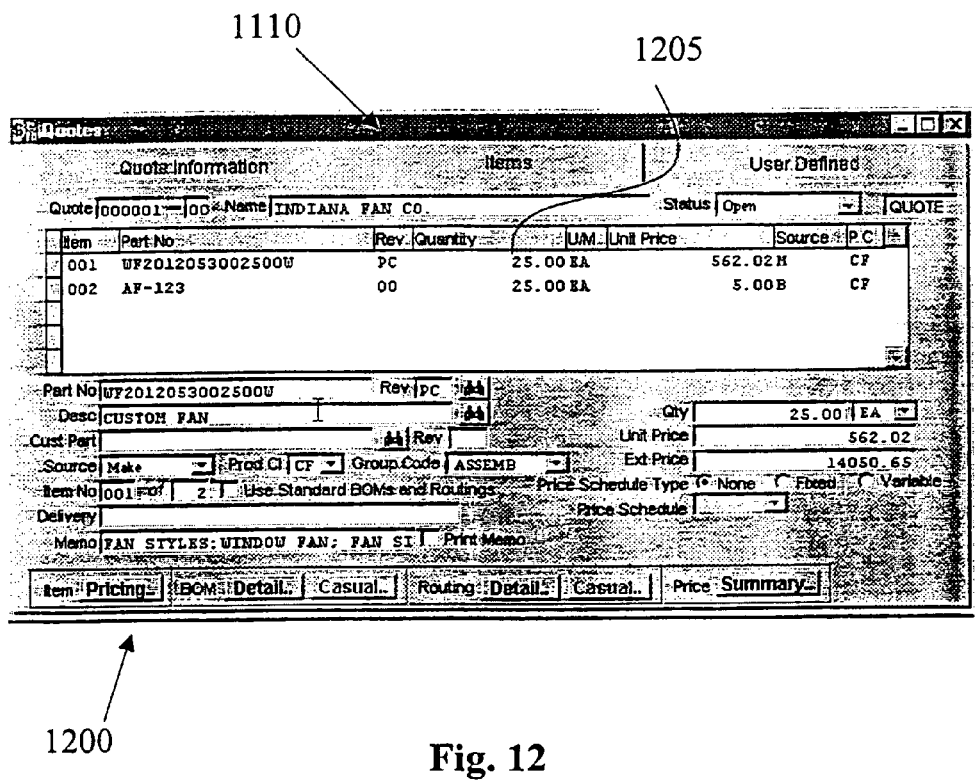
FIG. 12 is a representative data-editing screen for the sales line item sub-document part of the sales quote type business document-editing screen of FIG. 11.

Many actions are controlled by use of the cursor and mouse while in tree view control 60. FIG. 8 shows explore tab 10. Cursor 805, indicated by the shaded rectangle, has been placed over job order instance node 810. By right clicking, pop-up menu 815 is displayed. Pop-up menu 815 comprises 5 actions, namely, "Go To", "Expand", "Collapse", "Zoom In", and "Zoom Out." When selected, "Go To" causes an editing screen for the selected business document (or sub-document) to be launched directly from tree view control 60. Data editing screen 1000, shown in FIG. 10, is an embodiment of a data-editing screen for a customer document. Data-editing screen 1100 of FIG. 11 is an embodiment of a data-editing screen for a quote document, and data-editing screen 1200 of FIG. 12 shows an embodiment of a data-editing screen for a sales line item sub-document.

Continuing with pop-up menu 815, the "Expand" option expands one branch of the tree view. This operation is analogous to clicking on the '+' appearing to the left of the node. The "Collapse" option collapses one branch of the tree view. This operation is analogous to clicking on the '−' appearing to the left of an expanded node. "Zoom In" performs an exhaustive depth first exploration (explosion) from a chosen node. Rather than double clicking down a series of documents, the user can apply this operation to a node to see all related contents. This operation can expose a vast amount of information from hundreds to possibly thousands of nodes. The breadth of its execution is bound by a user-defined option (described below). "Zoom Out" is opposite the "Zoom In" operation. Thus it collapses ALL nodes on the selected level. The "Explore" option (not shown) is available on type nodes and drives the query to the next state in the state machine. This is the default double click behavior for a node.

With the exception of job order document type nodes, such as job order document type node 83, a document or sub-document type node will only appear as a subordinate document type node if the data base contains an instance node of the applicable type which is appropriately related to the dominant instance node. Thus, referring to FIG. 7, the display of document type nodes 705, 710, 715, and 720, indicate that there are instance nodes subordinate to those type nodes. However, to ascertain if there are job order instance nodes subordinate job order type node 725, job order document type node 725 must be explored. For practical reasons, the preferred embodiment displays a subordinate job order type node such as job order type node 725 whenever demand-side state machine 410 of FIG. 4 indicates that navigation to an existent job order would be allowed. For example, referring to FIG. 4, it is possible for job order 430 to be subordinate to customer 415, or sales order item release 465. Consequently, whenever a sales order item release or customer document instance node is displayed as an expanded dominant document instance node, such as document instance node 730 of FIG. 7, a job order document type node will be displayed. This designed anomaly reflects the fact that a potential exists for an excessive number of job orders within a given database, necessitating an extensive search to verify no applicable job orders exist. Therefore, while display of type nodes when no associated instance node exists is avoided so as to limit the amount of spurious information displayed to the user, a system designed to await search results for job orders has the potential for unduly delaying display of search results.

Consequently, the preferred embodiment will display a job order type node along with the actual search results, while completing the search of the job orders within a database.

Figure 2:
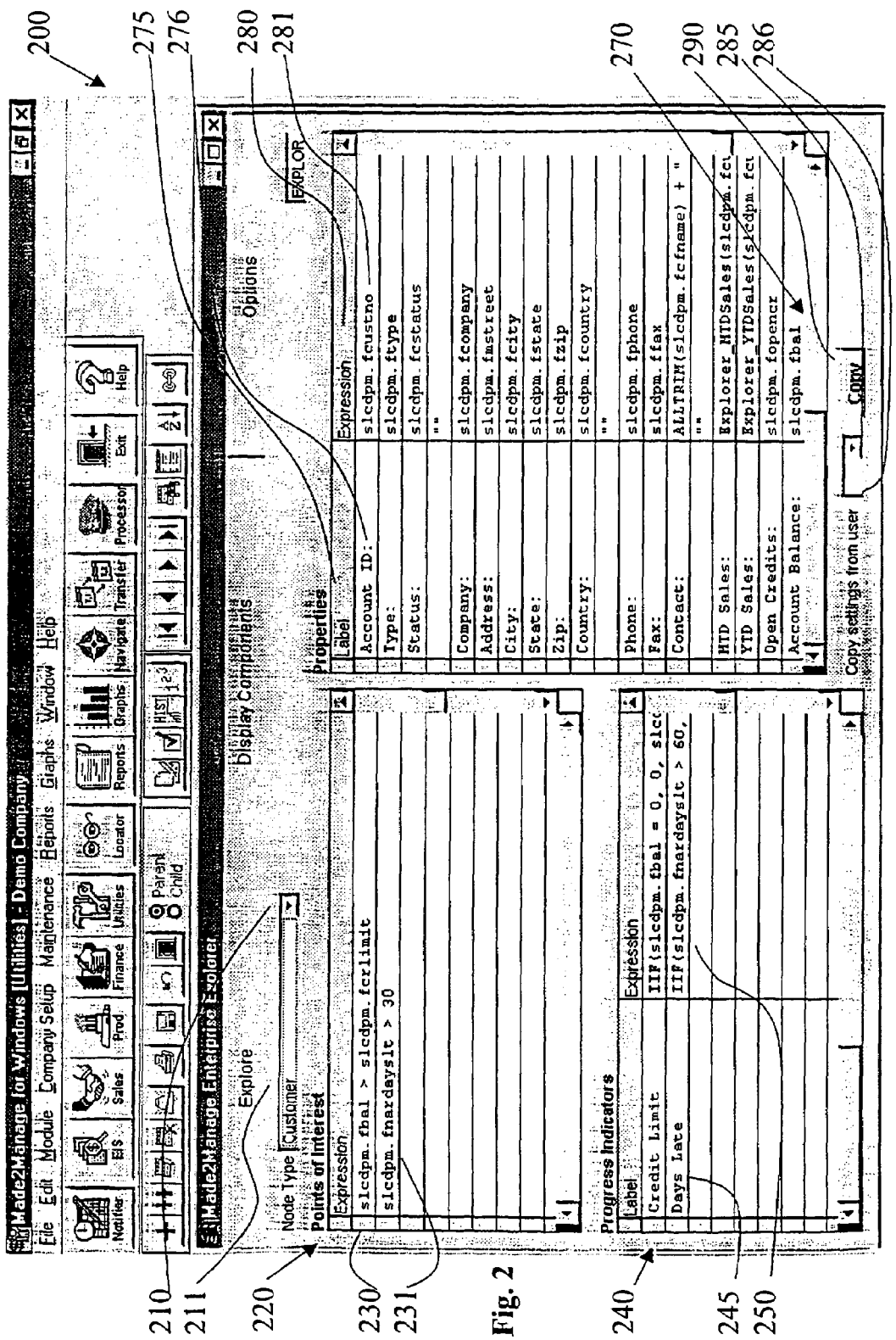
FIG. 2 shows a screen that may be used to specify the particular information to be displayed when a document or sub-document instance node is selected.
Figure 13:
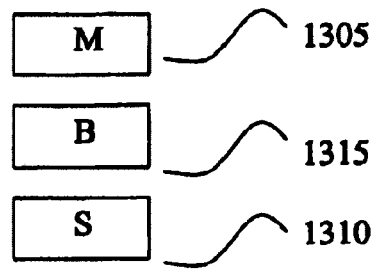
FIG. 13 shows representative icons that may be used to specify whether a particular Bill-of-Materials document is for a Make, Buy or Sell item.

The invention further comprises graphics (icons) such that a user can rapidly categorize the node type or node instance. Referring to FIG. 2, various icons for document and sub document type nodes are shown. The use of icons to visually symbolize different types of objects is well known in the art. In the same manner, document and sub-document instance nodes may also have a variety of distinct graphics that can be displayed in conjunction with the specific type of document or sub-document rendered. Even within a given type of document, various icons may be used to impart more particular information about the underlying instance. For example, referring to FIG. 13, representative examples of icons are shown that may be used to further categorize bills of material (BOM). Icon 1305 may be used to show a BOM for an item which will be manufactured internally, icon 1310 may be used to indicate the item is an item which must be bought, and icon 1315 may indicate an item which can be sold. Alternate associations are within the scope of the present invention. In addition to the graphics (icons) appearing in conjunction with the node's text, the appearance of the node's text itself may serve to differentiate. In the preferred embodiment, document and sub-document type nodes appear in bold text while document and sub-document instance nodes are not in bold text. This is shown, for example, in FIG. 1 by the text for document type node 80, "Sales Orders" which appears in bold text, and the text for document instance node 90, "001004-COBY EQUIPMENT CO." which is not in bold text.

Referring again to FIG. 1, a secondary graphic is defined. This icon is Point of Interest (POI) icon 97. In the preferred embodiment, POI icon 97 appears as a generalized warning symbol. The details of POI icon 97 are discussed below, but its primary purpose is normally to alert the user that a predefined condition exists.

Continuing with FIG. 1, view pane 30 is shown on explore tab 10. Two types of objects are shown in the embodiment of FIG. 1, progress indicators and properties. Referring to FIG. 1, progress indicators are rendered in label/3D panel pair 31 while the properties values are rendered in edit box 32. These two object types are used to provide informational feedback pertaining to the 'selected' document or sub-document instance node in tree view control 60. The definition of the expressions that generate these objects is discussed below. Progress indicators 33 and 34 comprise label 35 and bar graph 36. Also shown are properties values 37, 38 and 39. Each properties value comprises label 41 and expression 42. In the preferred embodiment, up to twenty progress indicators and an unlimited number of properties values may be defined for each document or sub-document instance node.

Referring now to FIG. 2, display components tab 200 is shown. Display components tab 200 comprises four primary controls; The first primary control is drop down combo box 210 which, when selected, causes a list of the document and sub-document instance nodes viewable in explore tab 10 shown in FIG. 1, to appear in text box 211. Highlighting the desired node serves to select/identify the specific document or sub-document instance node for which expressions are being displayed/modified in tab 200. As is discussed below, a second identifier, not shown, for a given editing session is the user under whose logon the invention is being accessed. So if, for example, a consultant or other technical personnel is defining expressions for a given user, they need to be logged in as that user so that the expressions created/modified are associated with that user and not the person manipulating the expression.

The second primary control is POI grid 220 that contains a single element, which must evaluate to a logical value. If the element evaluates to TRUE for a document or sub-document instance node of a type identified in drop down combo 210, POI icon 97 (shown on FIG. 1) will appear beside the document or sub-document instance node in tree view control 60 of explore tab 10 which is of the type identified in drop down combo 210. The element may comprise a single expression, or multiple expressions for a given document or sub-document type node. Referring to FIG. 2, POI expression 230 is shown in POI grid 220. This expression, if evaluated to true, would cause POI icon 97 to be displayed. However, since POI expression 231 is also present in POI grid 220, a logical "OR" is read between the expressions such that if either POI expression 2301 or POI expression 231 evaluates to true for a given document or sub-document instance which is of the type identified in drop down combo box 210, POI icon 97 will be displayed with the document or sub-document instance node on tree view control 60. The expression can, but need not, evaluate data directly associated with the document or sub-document instance node for which the expression is defined. Consequently, the expression or multiple expressions can evaluate data primarily associated with any document or sub-document, in any combination for a given POI. Thus, a sales person may create an expression that evaluates to true for a specific customer document instance node when three months has elapsed since the last order placed by the customer. This POI will only appear on explore tab 10 for the sales person's user logon, not, for example, on the accounts receivable clerk's explore tab 10. At the same time, the accounts receivable clerk may create an expression that evaluates to true for a given customer document instance node if a customer has an invoice outstanding for three months or more. In this case, when the expression evaluates to true, the POI would be present on the accounts receivable clerk's explore tab 10, but not on the sales person's explore tab 10. While several different POI expressions may be defined for a number of distinct users, there is no requirement that any be defined.

The third primary control is progress indicators grid 240 which comprises five elements, label 245, and expression 250, and lower bound, upper bound, and invert (not shown) which are to the right of expression 250. Label 245 can contain up to twenty characters of text that will be displayed to the left of bar graph 36 on view pane 31 as label 35 of FIG. 1. Expression 250 comprises the numeric expression used to render bar graph 36 as a bar progressing from left to right indicating from 0% to 100%. Expression 250 must return a value between zero and one and is typically of the form x/y. Bar graph 36 is rendered in one of three colors. In the preferred embodiment, this color scheme is red, yellow, and green. Upper bound and lower bound (not shown) serve to identify the threshold at which bar graph 36 changes from red to yellow and from yellow to green. Invert (not shown) is a check box, that when checked inverts the color scheme order of bar graph 36 from red, yellow, green to green, yellow, red. Up to twenty progress indicators may be identified for each document or sub-document instance node. As in the case of POIs discussed above, the progress indicators are uniquely programmable by each unique user.

Properties grid 270 comprises two sub-grids, specifically, label sub-grid 275 and expression sub-grid 280. Entries in label sub-grid 275 such as label sub-grid entry 276 can contain up to twenty characters of text are rendered as label 41 in properties pane 30 of explore tab 10, to the left of expression 42 as shown in FIG. 1. Entries in expression sub-grid 280 such as expression sub-grid entry 281 identify the specific data rendered as expression 42 in properties pane 30 of explore tab 10. This expression can evaluate to any of the common data types available in commercially available systems such as FoxPro, which is available from Microsoft of Seattle, Wash. The system converts entries under expression sub-grid 280 from the form "table.field" to characters. An unlimited number of values may be defined for each document or sub-document instance node. This feature of the present invention allows the individual user to determine the information within the document that is of the most importance to the user's function. For example, a shipping clerk selecting a customer document instance node would most likely be concerned with the address of the customer and preferred shipping means. Therefore, the shipping clerk has the ability to configure the invention to present this information when the customer document instance node is selected. The president of the company might be more interested in the names of the executives and the phone numbers for a customer. Therefore, the president could configure the invention to display this information when a customer document instance node is selected.

Editing in each grid is effected via a right click menu. Values present in a grid can be manipulated directly. Adding a new entry is accomplished via right-click/Add, the right click can occur anywhere within the bounds of the grid. Similarly, right clicking on the target item and then selecting the 'Delete' option from the popup menu removes an entry. In progress Indicators grid 240 and properties grid 270, the relative positions (ordering) of entries can be changed through Right Click/Move Up/Down. Relative position has no bearing for points of interest. The final option of the pop-up menu, Expression Builder, launches a dialog in which the expression can be manipulated.

The final user interface primary control that is shown on display components tab 200 comprises drop down combo box 285 and copy button 290. The development of point of interest, progress indicator, and property expressions can be a time consuming task. For many applications, it is not necessary for each user will have their own, entirely distinct, set of expressions. Rather, several distinct user classes or 'profiles' will suffice. Use of drop down combo box 285 and copy button 290 effects the copying of a set of expressions defined for one user to the set of expressions associated with another user. The copy 'source' user is determined by making a selection from drop down combo box 285 which displays all users with any expression(s) defined. Once a selection of a user is made, pressing copy button 290 completes the process. All expressions defined for the source user will be copied to the currently logged on (active) user. Any expressions previously defined for the active user are destroyed.

Figure 3:
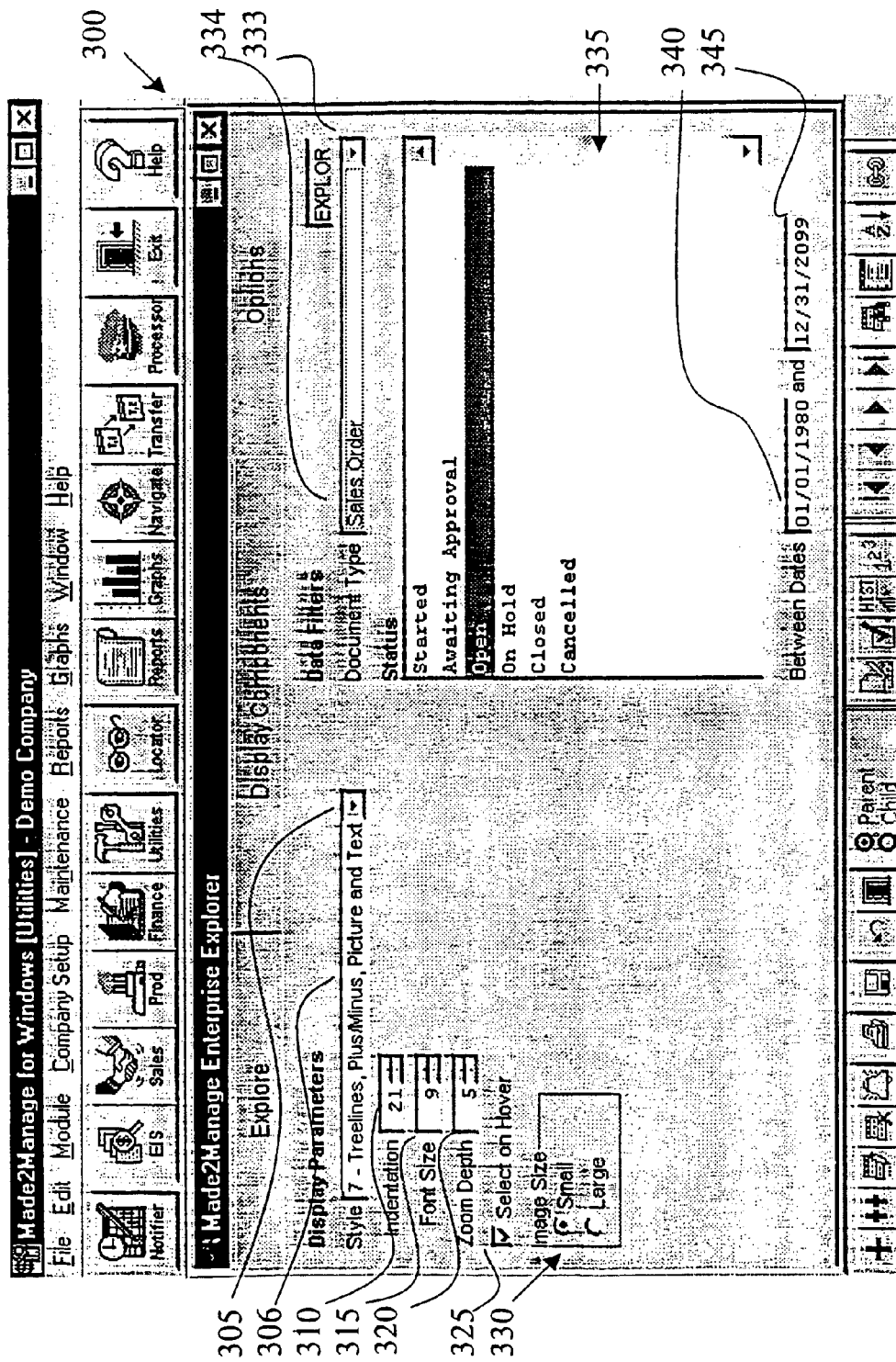
FIG. 3 shows a representative screen showing how options for displaying the hierarchical structure may be specified.
Figure 9:
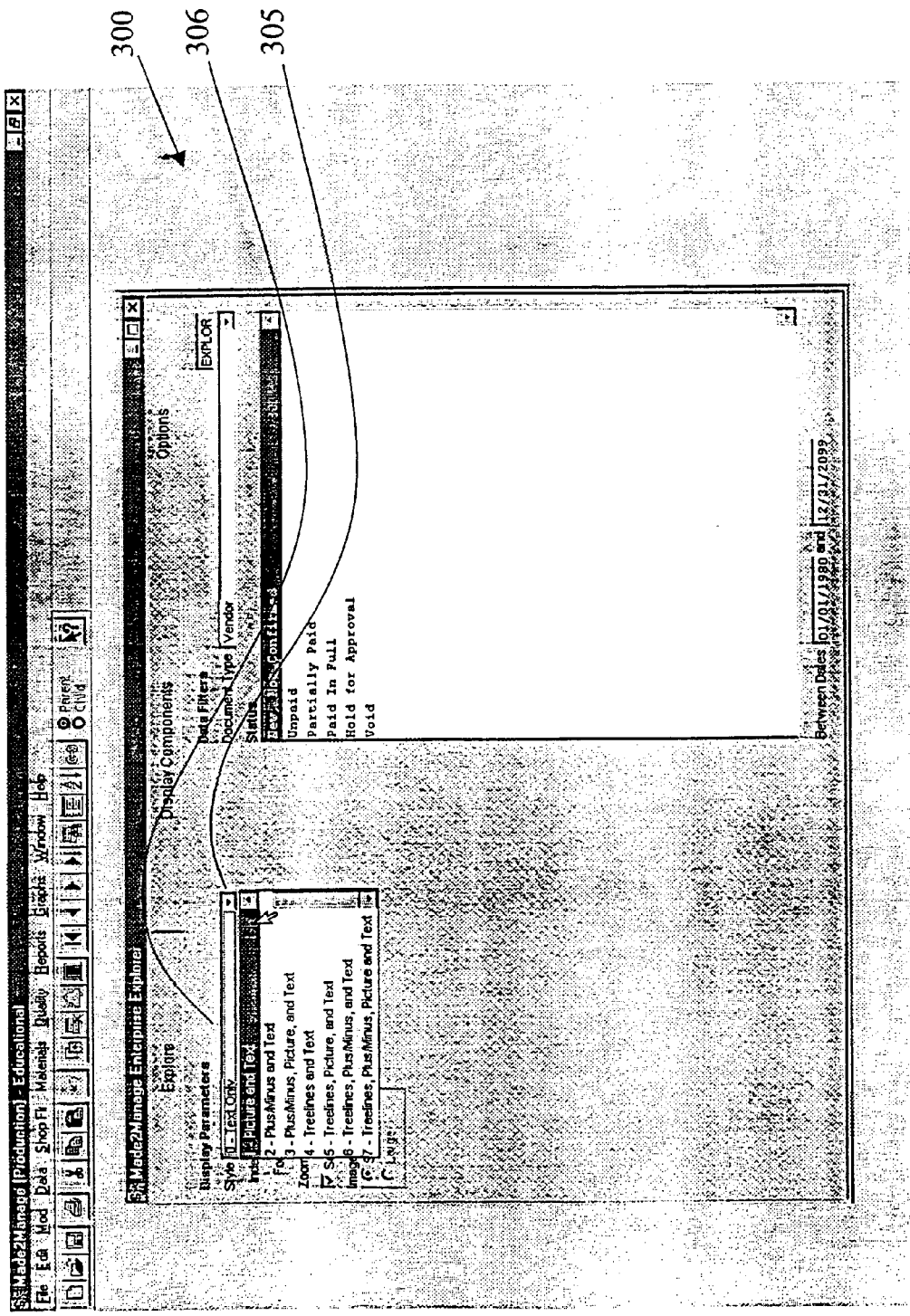
FIG. 9 shows the screen of FIG. 3 with representative display parameter options and data filter options.

Referring now to FIG. 3, the third tab, options tab 300 is shown. Options tab 300 comprises several user preferences and operational controls. Style drop down combo box 305 is a drop down combo box that controls the display aspects of tree view control 60 of navigation pane 20 of explore tab 10. The user can set any one of seven preferences that are listed in text box 306 when style drop down combo box 305 is selected. FIG. 9 shows options tab 300 with style drop down combo box 305 selected, and the seven available preferences.

Referring again to FIG. 3, other user preferences are described. Indentation spinner 310 is a spinner control that determines the amount of indentation (in pixels) that each subordinate level is indented from the dominant level in tree view control 60 of navigation pane 20 of explore tab 10. Font Size 315 is a spinner control that determines the relative size of the text appearing in tree view control 60 of navigation pane 20 of explore tab 10. Zoom Depth 320 is a spinner control that determines the maximum number of levels a 'Zoom In' operation will attempt. The zoom operation is the exhaustive exploration of a chosen node. Due to the nature of the relationships contained in the invention as embodied in the preferred embodiment, the number of nodes explored during the zoom operation could easily reach into the thousands. The purpose of this control is to place a practical limit on the exhaustive search. Image Size 330 is an option group that determines whether large or small graphics (icons) appear along with each node. In the preferred embodiment, "Large" is the default, and the user can choose between 16×16 or 32×32 (pixel) icons.

Select on Hover 325 is a check box that determines whether a given node is 'selected' simply by the fact that the mouse cursor is over it. Having this setting on a high performance system is desirable as view pane 30 will be refreshed as the mouse passes over each node; allowing the user to view progress indicators for a large number of nodes with relative ease.

Toward the right half of options tab 300 of FIG. 3 are shown several controls for the scope of the search of documents and sub-documents. As with expressions in points of interest grid 220, progress indicators grid 240, and properties grid 270, these 'filters' are persistently stored by user in the preferred embodiment. The process of setting filters is anchored by the selection of a document type by selecting drop down combo box 333 and selecting a document type from the drop down list. The selected document type is displayed in text box 334. Once a selection is made, status grid 335 will refresh, illustrating the document 'Statuses' available for the selected document or sub-document type and highlighting which of the statuses are selected for display. Status grid 335 is multi-select such that one, a combination, or all entries may be selected. It is important to note that these filters are placed on status grid 335 as defined by the preferred embodiment, and that no other logical expression may be applied. In addition, not all documents have a status. In these cases, status grid 335 is disabled. At the lower right hand portion of options tab 300 of FIG. 3 are shown date fields 340 and 345. These fields can be used to restrict the documents or sub-documents displayed on explore tab 10. The date fields can be used alone or in conjunction with the status filter to further restrict the records retrieved during exploration.

Software Implementation

The preferred embodiment of the present invention incorporates Active TreeView Control, a commercially produced tree control available from Sheridan Software Systems, Inc. of Melville N.Y. (Sheridan). System requirements for Active TreeView Control are available from Sheridan, as are descriptions of the included files (both distributable and non-distributable). In addition to these files, the present invention incorporates several additional files to effect various elements.

Icons associated with document type nodes and sub-document type nodes are displayed based upon the file NODEIMAGE.PRG as follows:

```
LPARAMETERS pcDocument Type, pIPlaceholder DO
CASE
  CASE pcDocumentType=CUSTOMER
    IF pIPlaceholder
      RETURN "FOLDERDOCUMENT"
    ELSE
      RETURN "DOCUMENT"
    ENDIF
  CASE pcDocumentType=QUOTE
    IF pIPlaceholder
      RETURN "FOLDERDOCUMENT"
    ELSE
      RETURN "DOCUMENT"
    ENDIF
  CASE pcDocumentType=QUOTE_ITEM
    IF pIPlaceholder
      RETURN "FOLDERITEM"
    ELSE
      RETURN "ITEM"
    ENDIF
  CASE pcDocumentType=QUOTE_ITEM_BOM
    IF pIPlaceholder
      RETURN "FOLDERBOM"
    ELSE
      RETURN "ITEMBOM"
    ENDIF
  CASE pcDocumentType=QUOTE_ITEM_RTG
    IF pIPlaceholder
      RETURN "FOLDERRTG"
    ELSE
      RETURN "ITEMRTG"
    ENDIF
  CASE pcDocumentType=SALES_ORDER
    IF pIPlaceholder
      RETURN "FOLDERDOCUMENT"
    ELSE
      RETURN "DOCUMENT"
    ENDIF
  CASE pcDocumentType=SALES_ORDER_ITEM
    IF pIPlaceholder
      RETURN "FOLDERITEM"
    ELSE
      RETURN "ITEM"
    ENDIF
  CASE pcDocumentType=SALES_ORDER_ITEM_RELEASE
    IF pIPlaceholder
      RETURN "FOLDERRELEASE"
    ELSE
      RETURN "RELEASE"
    ENDIF
  CASE pcDocumentType=SALES_ORDER_ITEM_BOM
    IF pIPlaceholder
      RETURN "FOLDERBOM"
    ELSE
      RETURN "ITEMBOM"
    ENDIF
  CASE pcDocumentType=SALES_ORDER_ITEM_RTG
    IF pIPlaceholder
      RETURN "FOLDERRTG"
    ELSE
      RETURN "ITEMRTG"
    ENDIF
  CASE pcDocumentType=JOB_ORDER
    IF pIPlaceholder
      RETURN "FOLDERDOCUMENT"
    ELSE
      RETURN "DOCUMENT"
    ENDIF
  CASE pcDocumentType=JO_BOM
    IF pIPlaceholder
      RETURN "FOLDERBOM"
    ELSE
      RETURN "ITEMBOM"
    ENDIF
  CASE pcDocumentType=JO_RTG
    IF pIPlaceholder
      RETURN "FOLDERRTG"
    ELSE
      RETURN "ITEMRTG"
    ENDIF
  CASE pcDocumentType=SHIPPER
    IF pIPlaceholder
      RETURN "FOLDERDOCUMENT"
    ELSE
      RETURN "DOCUMENT"
    ENDIF
  CASE pcDocumentType=SHIPPER_ITEM
    IF pIPlaceholder
      RETURN "FOLDERITEM"
    ELSE
      RETURN "ITEM"
    ENDIF
  CASE pcDocumentType=AR_INVOICE
    IF pIPlaceholder
      RETURN "FOLDERDOCUMENT"
    ELSE
      RETURN "DOCUMENT"
    ENDIF
  CASE pcDocumentType=AR_INVOICE_ITEM
    IF pIPlaceholder
      RETURN "FOLDERITEM"
    ELSE
      RETURN "ITEM"
    ENDIF
  CASE pcDocumentType=AR_PAYMENT
    IF pIPlaceholder
      RETURN "FOLDERDOCUMENT"
    ELSE
      RETURN "DOCUMENT"
    ENDIF
  CASE pcDocumentType=VENDOR
    IF pIPlaceholder
      RETURN "FOLDERDOCUMENT"
    ELSE
      RETURN "DOCUMENT"
    ENDIF
  CASE pcDocumentType=PURCHASE_ORDER
    IF pIPlaceholder
      RETURN "FOLDERDOCUMENT"
    ELSE
      RETURN "DOCUMENT"
    ENDIF
  CASE pcDocumentType=PURCHASE_ORDER_ITEM
    IF pIPlaceholder
      RETURN "FOLDERITEM"
    ELSE
      RETURN "ITEM"
    ENDIF
  CASE pcDocumentType=PURCHASE_ORDER_ITEM_RELEASE
    IF pIPlaceholder
      RETURN "FOLDERRELEASE"
```

```
ELSE
   RETURN "RELEASE"
ENDIF
CASE pcDocumentType=RECEIVER
IF pIPlaceholder
   RETURN "FOLDERDOCUMENT"
ELSE
   RETURN "DOCUMENT"
ENDIF
CASE pcDocumentType=RECEIVER_ITEM
IF pIPlaceholder
   RETURN "FOLDERITEM"
ELSE
   RETURN "ITEM"
ENDIF
CASE pcDocumentType=AP_INVOICE
IF pIPlaceholder
   RETURN "FOLDERDOCUMENT"
ELSE
   RETURN "DOCUMENT"
ENDIF
CASE pcDocumentType=AP_INVOICE_ITEM
IF pIPlaceholder
   RETURN "FOLDERITEM"
ELSE
   RETURN "ITEM"
ENDIF
CASE pcDocumentType=AP_PAYMENT
IF pIPlaceholder
   RETURN "FOLDERDOCUMENT"
ELSE
   RETURN "DOCUMENT"
ENDIF
CASE pcDocumentType=GL_ACCOUNT_CATEGORY
IF pIPlaceholder
   RETURN "FOLDERDOCUMENT"
ELSE
   RETURN "DOCUMENT"
ENDIF
CASE pcDocumentType=GL_ACCOUNT
IF pIPlaceholder
   RETURN "FOLDERDOCUMENT"
ELSE
   RETURN "DOCUMENT"
ENDIF
CASE pcDocumentType=GL_ACCOUNT_POSTING
IF pIPlaceholder
   RETURN "FOLDERITEM"
ELSE
   RETURN "ITEM"
ENDIF
CASE pcDocumentType=GL_JOURNAL
IF pIPlaceholder
   RETURN "FOLDERITEM"
ELSE
   RETURN "ITEM"
ENDIF
CASE pcDocumentType=OC_DISTRIBUTION
IF pIPlaceholder
   RETURN "FOLDERITEM"
ELSE
   RETURN "ITEM"
ENDIF
CASE pcDocumentType=AP_DISTRIBUTION
IF pIPlaceholder
   RETURN "FOLDERITEM"
ELSE
   RETURN "ITEM"
ENDIF
CASE pcDocumentType=AR_DISTRIBUTION
IF pIPlaceholder
   RETURN "FOLDERITEM"
ELSE
   RETURN "ITEM"
ENDIF
CASE pcDocumentType=PR_DISTRIBUTION
IF pIPlaceholder
   RETURN "FOLDERITEM"
ELSE
   RETURN "ITEM"
ENDIF
OTHERWISE
   OMsg.Stop("Programmer error, unexpected parameter passed. Offen ENDCASE

RETURN "UNKNOWN"
```

In the preferred embodiment, all points of interest, progress indicators, and property values are stored in a single table, 'EXPLORER.DBF'. EXPLORER.DBF is of the form:

| Field Name | Type | Width | Description |
|---|---|---|---|
| FCINITIALS | Character | 3 | The user (oSession.fcInitials) to whom this entry belongs |
| FCTYPE | Character | 1 | V = Properties, I = Point of Interest T = Progress Indicator |
| FCNODETYPE | Character | 10 | Note type (see above) to which it belongs (used to determine source table) |
| FIORDER | Integer | 4 | Order in which entry appears (1 Indexed) |
| FCLABEL | Character | 30 | Descriptive text appearing to the left of Property or Progress Indicator |
| FCEXPR | Character | 254 | Valid VFP expression that is evaluated to produce result |
| FILO | Integer | 4 | Lower transition (Green-Yellow) bound for Progress Indicator |
| FIHI | Integer | 4 | Upper transition (Yellow-Red) bound for Progress Indicator |
| FLINVTHERM | Logical | 1 | Causes progress indicator to go from Red-Yellow-Green |

A free table is placed in the ERP's primary data directory, typically x:\ERPDATA. If this table does not become part of the ERP database, 'ERPDATA.DBC' it is necessary for the data installer to appropriately place this file in the target environment.

The file for checking POI expressions is stored as POINTSOFINTEREST.PRG as follows:

```
LPARAMETERS poNode, pcDocument Type

LOCAL lcError

LOCAL lnError

SELECT csrilist

SCAN FOR ((UPPER(csrilist.fcinitials) UPPER (oSession.cInitials)) AND. (csrilist
   *Determine control value
   lnError=0
   lcError=ON ("ERROR")
   ON ERROR lnError=ERROR( )
   LxControlValue=EVALUATE (csrilist.fcexpr)
   ON ERROR &lcError.
   IF lnError=0
```

```
*No error, use calculated value
ELSE
    LxControlValue=.F.
ENDIF
ENDSCAN
RETURN " "
```
Additional functions and procedures (as opposed to simple expressions) used as expressions described above, are declared in the procedure file 'EXPLORER.PRG'. These procedures/functions are provided in EXPLORER.PRG and are as follows:

```
PROCEDURE Explorer_ARITEMShippedQuantity
PROCEDURE Explorer_CSPopText
PROCEDURE Explorer_JobQuantity
PROCEDURE Explorer_JOCostActual( )
PROCEDURE Explorer_JODRTGCostEstimate( )
PROCEDURE Explorer_JODRTGLaborCost
PROCEDURE Explorer_JODRTGOverheadCost
PROCEDURE Explorer_JODRTGUnitCost
PROCEDURE Explorer_JOMakeQuantity
PROCEDURE Explorer_MTDSales
PROCEDURE Explorer_QTDRTGLaborCost
PROCEDURE Explorer_QTDRTGOverheadCost
PROCEDURE Explorer_QTDRTGTotalCost
PROCEDURE Explorer_QTDRTGUnitCost
PROCEDURE Explorer_QuantityBO
PROCEDURE Explorer_QuantityCommitted
PROCEDURE Explorer_QuantityInInspection
PROCEDURE Explorer_QuantityInProcess
PROCEDURE Explorer_QuantityOnHand
PROCEDURE Explorer_QuantityOnOrder
PROCEDURE Explorer_ShipEarly
PROCEDURE Explorer_ShipVia
PROCEDURE Explorer_SODRTGLaborCost
PROCEDURE Explorer_SODRTGOverheadCost
PROCEDURE Explorer_SODRTGTotalCost
PROCEDURE Explorer_SODRTGUnitCost
PROCEDURE Explorer_SORelsOnTimePI
PROCEDURE Explorer_SORelsOnTimePOI
PROCEDURE Explorer_SORELSShipItem
PROCEDURE Explorer_SORELSUOM
PROCEDURE Explorer_SplitShip
PROCEDURE Explorer_Terms
PROCEDURE Explorer_UOM
PROCEDURE Explorer_YTDSales
```

The compiled version of this file, 'EXPLORER.FXP' must be present in the ERP's primary data directory x:\ERPDATA. Additionally, this file must be part of the ERP's setup.exe and be deployed to the target environment in the location described above. It is anticipated that additional functions/procedures would be useful in the target environment, addressing specific user requirements, said functions/procedures can be added to the .PRG file. However, once the .PRG file has been modified it must be recompiled, otherwise any new development will not be usable in the invention environment. These additional procedures and functions being obvious to those skilled in the art are within the scope of the present invention.

In order to capitalize on the significant 'programmability' offered by the present invention, one needs a basic understanding of how the expressions are 'rendered' in the view pane. The organization of the view pane is evaluated each time a new node type is selected. The number of, size, and relative location of progress indicators and the location of the 'Properties' pane are set. The values of each progress indicator and properties entries are evaluated each time a new node is chosen. Depending on the user selected hover option above, the selection of a new node can occur either by clicking on a node or by simply hovering the mouse over a node. In the latter case, the rendering of the view pane changes in rapid fashion: as the user drags the mouse down the tree view. Sixty or more nodes (depending on screen size, etc.) may be evaluated in a fraction of a second. For this reason, if rapid presentation of information is desired, it is important to develop expressions that can be readily evaluated. If a function/procedure is developed which looks at a given node and descends several levels deeper to gather more information, the system will respond more slowly. Therefore, a balance must be struck between descending to deeper levels to gather detailed information and forcing the user to 'explore' more deeply. Therefore, if a great deal of data is to be examined to yield a single or summary result, this task is better left to a report function which is invoked by the ERP system. If, however, the user is looking for an answer to a single instance, or identifying a particular problem area to be rapidly assessed, the invention is very useful.

OPERATION OF THE INVENTION

The operation of the preferred embodiment is explained. Once the invention has been launched, a user selects display components tab 200 of FIG. 2. User selects a node type by selecting drop down combo box 210, and highlighting "Customer" in text box 211. Desired points of interest for customer documents can then be defined by typing in the appropriate expression in points of interest grid 220. Labels and expressions can then be typed in for any desired progress indicators by typing the desired label into progress indicators grid 240. The details of the progress to be monitored are entered into progress indicators grid 240 along with a numeric value between zero and one for the upper and lower bounds, indicating when the progress bar graph should change in color from green, to yellow, to red. If desired, the order is reversed by checking the invert box found to the far right of expression 250.

The information to be displayed for the customer documents in properties pane 30 of explore tab 10 can be defined by typing the desired label into label sub-grid 275, and typing the desired expression into expression sub-grid 280. Alternatively, the pre-existing labels and expressions of another user may be copied by selecting drop down combo box 285, and selecting the user to be copied in text box 286. Copying of expressions and labels is then effected by selecting copy button 290.

This process is repeated for every document and sub-document type for which a point of interest, progress indicator, or display of information is desired. The user next selects options tab 300 of FIG. 3 to establish various display parameters.

The style of the hierarchical tree structure is set by selecting style drop down combo box 305 and highlighting the desired style in text box 306. Indentation for the subordinate levels is set by selecting the appropriate button on indentation spinner 310 to change the displayed number. Next, the user sets the number of levels to be controlled by the "zoom in" and 'zoom out' options of pop-up menu 815 of FIG. 8. Select on hover 325 is then checked to automatically refresh view pane 30 of FIG. 1 when the cursor highlights an instance node. The desired document statuses to be included in the tree are then set by selecting drop down combo box 333 and selecting the desired document type in text box 334. The operation is completed by highlighting the desired statuses in status grid 335. This sequence is repeated for all document and sub-document types that are desired to be shown in the hierarchical tree. The tree can be further limited by placing a date limit in date fields 340 and 345.

The user then selects explore tab 10 of FIG. 1 to navigate to the desired information. The tree is created in navigation pane 20 by first selecting drop down combo box 40 of explore tab 10. This causes a list of available document types to be displayed in text box 41. Highlighting a desired document type in text box 41 causes that document type to be displayed in text box 41, and a search to be conducted for that type of document, within the constraints established on options tab 300 of FIG. 3.

The results of an initial search (either a single document or several documents of the same type) are displayed in the tree view control 60. A placeholder node, corresponding to the document type identified in the drop down combo box appears as the root node as shown by document type node 80 in FIG. 1, and the result set of the search appears in tree view control 60. Alternatively, a search parameter may be typed in text box 50. This search adds only document and sub-document instance nodes for instances found to the tree. The actual instances are not retrieved the instance node is selected as is explained below. This two step methodology of first searching, and later retrieving, serves to balance response time for 'explore' requests between a single level search and an exhaustive search where hundreds if not thousands of records could be scanned.

Referring now to FIG. 7, an initial search is performed for customer documents. The corresponding logic in the preferred embodiment will add Customers document type node 735 and any customer numbers and names. From the initial search the user can 'drill down' into further detail by exploding the desired nodes until a leaf is reached; then taking one of the two following actions: double clicking on the leaf node or right clicking on the leaf node and choosing 'Explore' from the popup menu. This action will initiate the same two-level exploration of the chosen node type described above with the exception being that the document identifier is already present (it was the node chosen to explore).

Expansion of an instance node subordinate to customers document type node 735 will result in placeholder nodes for any document or sub-document types having an instance node under it, and a job order node regardless of any associated job order instances as explained above. This is shown in FIG. 7 by sales quotes document type node 705, sales order document type node 710, job orders document type node 725, shippers document type node 715, and AR invoices document type node 720.

Moving the cursor over an instance node causes the invention to retrieve the particular instance of the document or sub-document associated with the selected instance node. At this point, all of the document's or sub-document's fields are available to be evaluated. If data items are needed from an associated table a function/procedure must be developed to locate the related record(s) before the evaluation can take place. Typically, these functions/procedures will return the desired value itself. A good example of this would be the 'on-hand' functions used to determine various inventory statistics for a related item. Selection of the instance node causes properties pane 30 to be refreshed as a result of select on hover box 325, shown in FIG. 3, being checked. Thus, as the cursor highlights customer instance node 740, labels and expressions previously defined by the user in properties grid 270 of FIG. 2, for customer document types, are displayed. Further, any evaluation defined in progress indicators grid 240 of FIG. 2 will be initiated, and the results displayed. A typical result is shown as label 750 and bar graph 755 in FIG. 7. The expressions reflect information specific to the customer instance associated with instance node 740.

Modification of the actual instance is accomplished by selecting the instance, and right clicking the mouse. This causes pop up menu 815 (FIG. 8) to be displayed. Selection of the "Go To" option causes a data-editing screen for the selected instance to be displayed. For example, by selecting customer instance node 730 (FIG. 7), right clicking the mouse, and selecting the "Go To" option, data-editing screen 1000 shown in FIG. 10 is displayed.

Had the user instead explored customer instance node 745 of FIG. 7, quote instance nodes related to Indiana Fan Co. would have been displayed. Following the above "Go To" process, data-editing screen 1100 of FIG. 11 would be displayed for quote document 1115. Notice that text box 1105 reflects the same customer number used to identify customer instance node 745 of FIG. 7. From data-editing screen 1100 of FIG. 11, the user may select items tab 1110, causing items tab 1110 to be displayed as shown in data-editing screen 1200 of FIG. 12. This is the data-editing screen for quote line item document 1205 related to quote document 1115 shown in FIG. 11. Alternatively, the user could have drilled down to the sub-document instance node associated with quote line item document 1205, selected the sub-document instance node, and selected the "Go To" option from the pop-up menu.

Obviously, there exist a large number of variants to the above scenario. The invention may be used in any business setting, and a myriad of state machines may be created to optimize the invention for a particular application. Further, a plethora of alternate viewing, editing, and filtering methods are well known in the art. These and other modifications are obvious to those skilled in the art, and are considered within the scope of the present invention.

What is claimed is:

1. A software system comprising:
   representations of a plurality of business documents;
   means for relating the plurality of business documents;
   means for displaying a hierarchical tree structure of representations of business documents, the tree structure having at least one branch, wherein:
   the tree structure has a plurality of levels in a hierarchy, each level being in a dominant-subordinate relationship with each adjacent level,
   at least two levels in the same branch comprise at least one document type node and at least one document instance node,
   the document type nodes in at least two different levels in the same tree branch identify different types of business documents,
   each document instance node is:
      (a) immediately subordinate to a document type node,
      (b) associated with a representation of the same type of business document as a document instance node in the same level of the same branch, and
      (c) associated with a representation of a business document that is related to a representation of a business document associated with a document instance node in another level in the same branch;
   means for selecting a particular document instance node;
   means for displaying information contained in the representation of a business document associated with a selected document instance node; and at least one representation of a sub-document wherein:
the means for relating the plurality of business documents further comprises means for relating sub-documents;
the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;
each sub-document instance node is:
 (d) immediately subordinate to a sub-document type node;
 (e) associated with a representation of the same type of sub-document as a sub-document instance node in the same level of the same branch; and
 (f) related to a representation of a business document associated with a document instance node in another level in the branch; and wherein
the means for selecting further comprises means for selecting a particular sub-document instance node; and wherein
the means for displaying information further comprises means for displaying information contained in the representation of a sub-document associated with the selected sub-document instance node.

2. The system of claim 1 wherein each node may be collapsed and expanded, such that when expanded, any nodes immediately subordinate to the expanded node in the hierarchical tree structure are displayed.

3. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
 (a) immediately subordinate to a document type node,
 (b) associated with a representation of the same type of business document as a document instance node in the same level of the same branch, and
 (c) associated with a representation of a business document that is related to a representation of a business document associated with a document instance node in another level in the same branch;
means for selecting a particular document instance node;
means for displaying information contained in the representation of a business document associated with a selected document instance node; and
wherein a document type node of a dominant hierarchical level comprises a customer document type node, and at least one document type node of a hierarchical level subordinate to the level comprising a customer document type node, the customer document type node comprising either a quote document type node, a sales order document type node, a job order document type node, a shipper document type node, an accounts receivable invoice document type node or an accounts receivable payment document type node.

4. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
 (a) immediately subordinate to a document type node,
 (b) associated with a representation of the same type of business document as a document instance node in the same level of the same branch, and
 (c) associated with a representation of a business document that is related to a representation of a business document associated with a document instance node in another level in the same branch;
means for selecting a particular document instance node;
means for displaying information contained in the representation of a business document associated with a selected document instance node; and
wherein a document type node of a dominant hierarchical level comprises a quote document type node, and at least one document type node of a hierarchical level subordinate to the level comprising a quote document type node comprises either a quote item bill of materials document type node or a quote item routing step document type node.

5. The system of claim 4 further comprising at least one representation of a sub-document wherein:
the means for relating the plurality of business documents further comprises means for relating sub-documents;
the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;
each sub-document instance node is:
 (a) immediately subordinate to a sub-document type node;
 (b) associated with a representation of the same type of sub-document as a sub-document instance node in the same level of the same branch; and
 (c) related to a representation of a business document associated with a document instance node in another level in the branch; and wherein the means for selecting further comprises means for selecting a particular sub-document instance node; and wherein
the means for displaying information further comprises means for displaying information contained in the representation of a sub-document associated with the selected sub-document instance node; and wherein a sub-document type node of a hierarchical level subordinate to the level comprising a quote document type node comprises a quote line item sub-document type node.

6. A software system comprising:

representations of a plurality of business documents;

means for relating the plurality of business documents;

means for displaying a hierarchical tree structure of representations of business documents, the tree structure having at least one branch wherein:

the tree structure has a plurality of levels in a hierarchy each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a sales order document type node, and at least one document type node of a hierarchical level subordinate to the level comprising a sales order document type node comprises either a sales order item release document type node, a sales order item bill of materials document type node, a shipper document type node, or a sales order item routing step document type node.

7. The system of claim 6 further comprising at least one representation of a sub-document wherein:

the means for relating the plurality of business documents further comprises means for relating sub-documents;

the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;

each sub-document instance node is:
(a) immediately subordinate to a sub-document type node;
(b) associated with a representation of the same type of sub-document as a sub-document instance node in the same level of the same branch; and
(c) related to a representation of a business document associated with a document instance node in another level in the branch; and wherein the means for selecting further comprises means for selecting a particular sub-document instance node; and wherein the means for displaying information further comprises means for displaying information contained in the representation of a sub-document associated with the selected sub-document instance node; and wherein a sub-document type node of a hierarchical level subordinate to the level comprising a sales order document type node comprises a sales order line item sub-document type node.

8. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a job order document type node, and at least one document type node of a hierarchical level subordinate to the level comprising a job order document type node comprises either a job order bill of materials document type node, a job order routing step document type node, or a shipper document type node.

9. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;
means for displaying information contained in the representation of a business document associated with a selected document instance node; and
wherein a document type node of a dominant hierarchical level comprises a shipper document type node, and at least one document type node of a hierarchical level subordinate to the level comprising a shipper document type node comprises an accounts receivable invoice document type node.

10. The system of claim 9 further comprising at least one representation of a subdocument wherein:
the means for relating the plurality of business documents further comprises means for relating sub-documents;
the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;
each sub-document instance node is:
 (a) immediately subordinate to a sub-document type node;
 (b) associated with a representation of the same type of sub-document as a sub-document instance node in the same level of the same branch; and
 (c) related to a representation of a business document associated with a document instance node in another level in the branch; and wherein
the means for selecting further comprises means for selecting a particular sub-document instance node; and wherein
the means for displaying information further comprises means for displaying information contained in the representation of a sub-document associated with the selected sub-document instance node; and wherein
a sub-document type node of a hierarchical level subordinate to the level comprising a shipper document type node comprises a shipper line item sub-document type node.

11. A software system comprising:
representations of a plurality of business documents;
means for relating the plurality of business documents;
means for displaying a hierarchical tree structure of representations of business documents the tree structure having at least one branch, wherein:
the tree structure has a plurality of levels in a hierarchy, each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
 (a) immediately subordinate to a document type node,
 (b) associated with a representation of the same type of business document as a document instance node in the same level of the same branch, and
 (c) associated with a representation of a business document that is related to a representation of a business document associated with a document instance node in another level in the same branch;

means for selecting a particular document instance node;
means for displaying information contained in the representation of a business document associated with a selected document instance node; and
wherein a document type node of a dominant hierarchical level comprises an accounts receivable invoice document type node, and at least one document type node of a hierarchical level subordinate to the level comprising an accounts receivable invoice document type node comprises an accounts receivable payment document type node.

12. The system of claim 11 further comprising at least one representation of a subdocument wherein:
the means for relating the plurality of business documents further comprises means for relating sub-documents;
the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;
each sub-document instance node is:
 (a) immediately subordinate to a sub-document type node;
 (b) associated with a representation of the same type of sub-document as a sub-document instance node in the same level of the same branch; and
 (c) related to a representation of a business document associated with a document instance node in another level in the branch; and wherein
the means for selecting further comprises means for selecting a particular sub-document instance node; and wherein
the means for displaying information further comprises means for displaying information contained in the representation of a sub-document associated with the selected sub-document instance node; and wherein
a sub-document type node of a hierarchical level subordinate to the level comprising an accounts receivable invoice document type node comprises an accounts receivable invoice line item sub-document type node.

13. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
 (a) immediately subordinate to a document type node,
 (b) associated with a representation of the same type of business document as a document instance node in the same level of the same branch, and
 (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a sales order item release document type node, and at least one document type node of a hierarchical level subordinate to the level comprising a sales order item release document type node comprises either a job order document type node, or a shipper document type node.

14. A software system comprising:

representations of a plurality of business documents;

means for relating the plurality of business documents;

means for displaying a hierarchical tree structure of representations of business documents, the tree structure having at least one branch wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
  (a) immediately subordinate to a document type node,
  (b) associated with a representation of the same type of business document as a document instance node in the same level of the same branch, and
  (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a vendor document type node, and at least one document type node of a hierarchical level subordinate to the level comprising a vendor document type node comprises either a purchase order document type node, a shipper document type node, a receiver document type node, or an accounts payable invoice document type node.

15. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
  (a) immediately subordinate to a document type node,
  (b) associated with a representation of the same type of business document as a document instance node in the same level of the same branch, and
  (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a purchase order document type node, and at least one document type node of a hierarchical level subordinate to the level comprising a purchase order document type node comprises either a purchase order item release document type node, a shipper document type node, or a receiver document type node.

16. The system of claim 15 further comprising at least one representation of a subdocument wherein:

the means for relating the plurality of business documents further comprises means for relating sub-documents;

the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;

each sub-document instance node is:
  (a) immediately subordinate to a sub-document type node;
  (b) associated with a representation of the same type of sub-document as a sub-document instance node in the same level of the same branch; and
  (c) related to a representation of a business document associated with a document instance node in another level in the branch; and wherein the means for selecting further comprises means for selecting a particular sub-document instance node; and wherein the means for displaying information further comprises means for displaying information contained in the representation of a sub-document associated with the selected sub-document instance node; and wherein a sub-document type node of a hierarchical level subordinate to the level comprising a purchase order document type node comprises a purchase order line item sub-document type node.

17. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;
means for selecting a particular document instance node;
means for displaying information contained in the representation of a business document associated with a selected document instance node; and
wherein a document type node of a dominant hierarchical level comprises a receiver document type node, and at least one document type node of a hierarchical level subordinate to the level comprising a receiver document type node comprises an accounts payable invoice document type node.

18. The system of claim 17 further comprising at least one representation of a subdocument wherein:
the means for relating the plurality of business documents further comprises means for relating sub-documents;
the tree structure includes at least one branch having levels comprising at least a dominant level, a subordinate level and a sub-subordinate level, and wherein the dominant and sub-subordinate levels comprise document type nodes associated with representations of different business document types and the subordinate level comprises a sub-document type node and at least one sub-document instance node associated with the at least one representation of a business sub-document;
each sub-document instance node is:
(a) immediately subordinate to a sub-document type node;
(b) associated with a representation of the same type of sub-document as a sub-document instance node in the same level of the same branch; and
(c) related to a representation of a business document associated with a document instance node in another level in the branch; and wherein
the means for selecting further comprises means for selecting a particular sub-document instance node; and wherein
the means for displaying information further comprises means for displaying information contained in the representation of a sub-document associated with the selected sub-document instance node; and wherein
a sub-document type node of a hierarchical level subordinate to the level comprising a receiver document type node comprises a receiver line item sub-document type node.

19. A software system comprising:
representations of a plurality of business documents;
means for relating the plurality of business documents;
means for displaying a hierarchical tree structure of representations of business documents the tree structure having at least one branch, wherein:
the tree structure has a plurality of levels in a hierarchy, each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;
means for selecting a particular document instance node;
means for displaying information contained in the representation of a business document associated with a selected document instance node; and
wherein a document type node of a dominant hierarchical level comprises an accounts payable invoice document type node, and at least one document type node of a hierarchical level subordinate to the level comprising an accounts payable invoice document type node comprises an accounts payable payment document type node.

20. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy each level being in a dominant-subordinate relationship with each adjacent level,
at least two levels in the same branch comprise at least one document type node and at least one document instance node,
the document type nodes in at least two different levels in the same tree branch identify different types of business documents,
each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;
means for selecting a particular document instance node;
means for displaying information contained in the representation of a business document associated with a selected document instance node; and
wherein a document type node of a dominant hierarchical level comprises a general ledger account category document type node, and at least one document type node of a hierarchical level subordinate to the level comprising a general ledger account category document type node comprises a general ledger account document type node.

21. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy each level being in a dominant-subordinate relationship with each adjacent level,
at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a general ledger account document type node, and at least one document type node of a hierarchical level subordinate to the level comprising a general ledger account document type node comprises a general ledger account postings document type node.

22. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a general ledger account postings document type node, and at least one document type node of a hierarchical level subordinate to the level comprising a general ledger account postings document type node comprises a general journal entry document type node.

23. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch:

means for selecting a particular document instance node;

means for displaying information contained in the representation of a business document associated with a selected document instance node; and wherein a document type node of a dominant hierarchical level comprises a general journal entry document type node, and at least one document type node of a hierarchical level subordinate to the level comprising a general journal entry document type node comprises either an accounts payable sub-ledger document type node, an accounts receivable sub-ledger document type node, a payroll sub-ledger document type node, or an order costing sub-ledger document type node.

24. A software system comprising:

representations of a plurality of business documents;

means for relating the plurality of business documents;

means for displaying a hierarchical tree structure of representations of business documents the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
(a) immediately subordinate to a document type node,
(b) associated with a representation of the same type of business document as a document instance node in the same level of the same branch, and
(c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises an accounts payable sub-ledger document type node, and at least one document type node of a hierarchical level subordinate to the level comprising an accounts payable sub-ledger document type node comprises an accounts payable invoice document type node.

25. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
   (a) immediately subordinate to a document type node,
   (b) associated with a representation of the same type of business document as a document instance node in the same level of the same branch, and
   (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises an accounts receivable sub-ledger document type node, and at least one document type node of a hierarchical level subordinate to the level comprising an accounts receivable sub-ledger document type node comprises an accounts receivable invoice document type node.

26. The system according to claim 1 wherein the means for selecting a particular document instance node or sub-document instance node comprises means responsive to presence of a cursor over the node.

27. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
   (a) immediately subordinate to a document type node,
   (b) associated with a representation of the same type of business document as a document instance node in the same level of the same branch, and
   (c) associated with a representation of a business document that is related to a representation of a business document associated with a document instance node in another level in the same branch;

means for selecting a particular document instance node;

means for displaying information contained in the representation of a business document associated with a selected document instance node; and wherein the means for displaying includes icons, at least one of the at least one document instance node of the at least two levels comprises either a quote item bill of materials document instance node, a sales order item bill of materials document instance node, or a job order bill of materials document instance node; and wherein the icon associated with the bill of materials document instance node is visually different depending on whether the document represented by the icon is: (a) a make item; (b) a stock item; or (c) a buy item.

28. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy each level being in a dominant-subordinate relationship with each adjacent level, at least two levels in the same branch comprise at least one document type node and at least one document instance node, the document type nodes in at least two different levels in the same tree branch identify different types of business documents, each document instance node is:
   (a) immediately subordinate to a document type node,
   (b) associated with a representation of the same type of business document as a document instance node in the same level of the same branch, and
   (c) associated with a representation of a business document that is related to a representation of a business document associated with a document instance node in another level in the same branch;

means for selecting a particular document instance node;

means for displaying information contained in the representation of a business document associated with a selected document instance node;

a point of interest expression, and means for displaying a point of interest indicator for each document instance node in which the point of interest expression is met.

29. The software system according to claim 1, further comprising:

a filter text box into which characters may be entered; and a means for limiting the display of document instance nodes based on characters entered into the filter text box.

30. The software system according to claim 1, further comprising:

a user interface for displaying a representation of a business document, the user interface comprising means for launching the means for displaying the hierarchical tree structure.

31. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node;
means for displaying information contained in the representation of a business document associated with the selected document instance node;
at least one representation of a subdocument wherein:
  the means for relating the plurality of business documents further comprises means for relating sub-documents; and
  the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;
each sub-document instance node:
  (c) is related to a representation of a business document associated with a document instance node in another level in the branch; and
  (d) is associated with the same type of sub-document associated with the subdocument instance node in the same level of the same branch;
the means for selecting a particular document instance node further comprises means for selecting a particular sub-document instance node; and wherein
the means for displaying information contained in the representation of a document associated with the selected document instance node further comprises means for displaying information contained in the representation of a sub-document associated with the selected sub-document instance node.

32. The system of claim 31 wherein each node may be collapsed and expanded, such that when expanded, any nodes immediately subordinate to the expanded node in the hierarchical tree structure are displayed.

33. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises a quote document instance node, and at least one document instance node of a hierarchical level subordinate to the level comprising a quote document instance node comprises either a quote item bill of materials document instance node or a quote item routing step document instance node.

34. The system of claim 33 further comprising at least one representation of a subdocument wherein:
the means for relating the plurality of business documents further comprises means for relating sub-documents;
the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;
each sub-document instance node:
  (a) is related to a representation of a business document associated with a document instance node in another level in the branch; and
  (b) is associated with the same type of sub-document associated with the sub-document instance node in the same level of the same branch;
the means for selecting a particular document instance node further comprises means for selecting a particular sub-document instance node; and wherein
the means for displaying information contained in the representation of a document associated with the selected document instance node further comprises means for displaying information contained in the representation of a sub-document associated with the selected sub-document instance node; and wherein
a sub-document instance node of a hierarchical level subordinate to the level comprising a quote document instance node comprises a quote line item sub-document instance node.

35. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a sales order document instance node, and at least one document instance node of a hierarchical level subordinate to the level comprising a sales order document instance node comprises either a sales order item release document instance node, a sales order bill of materials document instance node, a shipper document instance node, or a sales order item routing step document instance node.

36. The system of claim 35 further comprising at least one representation of a subdocument wherein:

the means for relating the plurality of business documents further comprises means for relating sub-documents;

the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;

each sub-document instance node:
  (a) is related to a representation of a business document associated with a document instance node in another level in the branch; and
  (b) is associated with the same type of sub-document associated with the subdocument instance node in the same level of the same branch;

the means for selecting a particular document instance node further comprises means for selecting a particular sub-document instance node; and wherein the means for displaying information contained in the representation of a document associated with the selected document instance node further comprises means for displaying information contained in the representation of a sub-document associated with the selected sub-document instance node; and wherein a sub-document instance node of a hierarchical level subordinate to the level comprising a sales order document instance node comprises a sales order line item subdocument instance node.

37. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a job order document instance node, and at least one document instance node of a hierarchical level subordinate to the level comprising a job order document instance node comprises either a job order bill of materials document instance node, a job order routing step document instance node, or a shipper document instance node.

38. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a shipper document instance node, and at least one document instance node of a hierarchical level subordinate to the level comprising a shipper document instance node comprises an accounts receivable invoice document instance node.

39. The system of claim 38 further comprising at least one representation of a subdocument wherein:

the means for relating the plurality of business documents further comprises means for relating sub-documents;

the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;

each sub-document instance node:
  (a) is related to a representation of a business document associated with a document instance node in another level in the branch; and (b) is associated with the same type of sub-document associated with the subdocument instance node in the same level of the same branch;
the means for selecting a particular document instance node further comprises means for selecting a particular sub-document instance node; and wherein
the means for displaying information contained in the representation of a document associated with the selected document instance node further comprises means for displaying information contained in the representation of a sub-document associated with the selected sub-document instance node; and wherein
a sub-document instance node of a hierarchical level subordinate to the level comprising a shipper document instance node comprises a shipper line item sub-document instance node.

40. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises an accounts receivable invoice document instance node, and at least one document instance node of a hierarchical level subordinate to the level comprising an accounts receivable invoice document instance node comprises an accounts receivable payment document instance node.

41. The system of claim 40 further comprising at least one representation of a subdocument wherein:
the means for relating the plurality of business documents further comprises means for relating sub-documents;
the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;
each sub-document instance node:
  (a) is related to a representation of a business document associated with a, document instance node in another level in the branch; and
  (b) is associated with the same type of sub-document associated with the subdocument instance node in the same level of the same branch;
the means for selecting a particular document instance node further comprises means for selecting a particular sub-document instance node; and wherein
the means for displaying information contained in the representation of a document associated with the selected document instance node further comprises means for displaying information contained in the representation of a sub-document associated with the selected sub-document instance node; and wherein
a sub-document instance node of a hierarchical level subordinate to the level comprising an accounts receivable invoice document instance node comprises an accounts receivable invoice line item sub-document instance node.

42. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises a sales order item release document instance node, and at least one document instance node of a hierarchical level subordinate to the level comprising a sales order item release document instance node comprises either a job order document instance node, or a shipper document instance node.

43. A software system comprising:
representations of a plurality of business documents;
means for relating the plurality of business documents;
means for displaying a hierarchical tree structure of representations of business documents, the tree structure having at least one branch wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises a vendor document instance node, and at least one document instance node of a hierarchical level subordinate to the level comprising a vendor document instance node comprises either a purchase order document instance node, a shipper document instance node, a receiver document instance node, or an accounts payable invoice document instance node.

44. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises a purchase order document instance node, and at least one document instance node of a hierarchical level subordinate to the level comprising a purchase order document instance node comprises either a purchase order item release document instance node, a shipper document instance node, or a receiver document instance node.

45. The system of claim 44 further comprising at least one representation of a sub-document wherein:
the means for relating the plurality of business documents further comprises means for relating sub-documents;
the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;
each sub-document instance node:
  (a) is related to a representation of a business document associated with a document instance node in another level in the branch; and
  (b) is associated with the same type of sub-document associated with the sub-document instance node in the same level of the same branch;
the means for selecting a particular document instance node further comprises means for selecting a particular sub-document instance node; and wherein:
the means for displaying information contained in the representation of a document associated with the selected document instance node father comprises means for displaying information contained in the— representation of a sub-document associated with the selected sub-document instance node; and wherein
a sub-document instance node of a hierarchical level subordinate to the level comprising a purchase order document instance node comprises a purchase order line item sub-document instance node.

46. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises a receiver document instance node, and at least one document instance node of a hierarchical level subordinate to the level comprising a receiver document instance node comprises an accounts payable invoice document instance node.

47. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node;

at least one representation of a subdocument wherein:

the means for relating the plurality of business documents further comprises means for relating sub-documents;

the tree structure levels comprise at least a dominant level, a subordinate level and a sub-subordinate level, and wherein the dominant and sub-subordinate levels comprise at least one document instance node for different business document types and the subordinate level comprises at least one sub-document instance node associated with a representation of a business sub-document;

each sub-document instance node:
  (c) is related to a representation of a business document associated with a document instance node in another level in the branch; and
  (d) is associated with the same type of sub-document associated with the sub-document instance node in the same level of the same branch;

the means for selecting a particular document instance node further comprises means for selecting a particular sub-document instance node; and wherein the means for displaying information contained in the representation of a document associated with the selected document instance node further comprises means for displaying information contained in the representation of a sub-document associated with the selected sub-document instance node; and wherein a sub-document instance node of a hierarchical level subordinate to the level comprising a receiver document instance node comprises a receiver line item sub-document instance node.

48. A software system comprising:

representations of a plurality of business documents;

means for relating the plurality of business documents;

means for displaying a hierarchical tree structure of representations of business documents, the tree structure having at least one branch wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises an accounts payable invoice document instance node, and at least one document instance node of a hierarchical level subordinate to the level comprising an accounts payable invoice document instance node comprises an accounts payable payment document instance node.

49. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
  (a) associated with a representation of the same type of business document associated with a document instance node in the same level of the same branch
  (b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a general ledger account category document instance node, and at least one document instance node of a hierarchical level subordinate to the level comprising a general ledger account category document instance node comprises a general ledger account document instance node.

50. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
(a) associated with a representation of the same type of business document associated with a document instance node in the same level of the same branch
(b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a general ledger account document instance node, and at least one document instance node of a hierarchical level subordinate to the level comprising a general ledger account document instance node comprises a general ledger account postings document instance node.

51. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
(a) associated with a representation of the same type of business document associated with a document instance node in the same level of the same branch
(b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a general ledger account postings document instance node, and at least one document instance node of a hierarchical level subordinate to the level comprising a general ledger account postings document instance node comprises a general journal entry document instance node.

52. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
(a) associated with a representation of the same type of business document associated with a document instance node in the same level of the same branch
(b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises a general journal entry document instance node, and at least one document instance node of a hierarchical level subordinate to the level comprising a general journal entry document instance node comprises either an accounts payable sub-ledger document instance node, an accounts receivable subledger document instance node, a payroll sub-ledger document instance node, or an order costing sub-ledger document instance node.

53. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document instance node, the document instance nodes in at least two different levels of the same tree branch are associated with representations of different types of business documents, each document instance node is:
(a) associated with a representation of the same type of business document associated with a document instance node in the same level of the same branch
(b) associated with a representation of a business document that is related to a representation of a business document associated with a document instance node in another level in the same branch;

means for selecting a particular business document instance node; and means for displaying information contained in the representation of a business document associated with the selected document instance node; and wherein a document instance node of a dominant hierarchical level comprises an accounts payable sub-ledger document instance node, and at least one document instance node of a hierarchical level subordinate to the level comprising an accounts payable sub-ledger document instance node comprises an accounts payable invoice document instance node.

54. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and
wherein a document instance node of a dominant hierarchical level comprises an accounts receivable sub-ledger document instance node, and at least one document instance node of a hierarchical level subordinate to the level comprising an accounts receivable invoice document instance node.

55. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
(a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node:
wherein the means for displaying includes icons,
at least one of the at least one document instance node of the at least two levels comprises either a quote item bill of materials document instance node, a sales order item bill of materials document instance node, or a job order bill of materials document instance node; and
wherein the icon associated with the bill of materials document instance node is visually different depending on whether the document represented by the icon is: (a) a make item; (b) a stock item; or (c) a buy item.

56. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node;
means for accessing a representation of a business document referred to by a document instance node; and
means for launching the means for accessing from the display of a representation of a business document instance node in the hierarchical tree structure.

57. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node; and
means for displaying information contained in the representation of a business document associated with the selected document instance node; and a user interface for displaying a representation of a business document, the user interface comprising means for launching the means for displaying the hierarchical tree structure.

58. The system of claim 57 wherein:

upon launching the display of the hierarchical tree structure, the top level of the tree comprises a document type node that corresponds to the type of a business document displayed by the user interface and a document instance node that corresponds to the representation of a business document displayed by the user interface.

59. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
  (a) immediately subordinate to a document type node,
  (b) associated with a representation of the same type of business document as a document instance node in the same level of the same branch, and
  (c) associated with a representation of a business document that is related to a representation of a business document associated with a document instance node in another level in the same branch;

means for selecting a particular document instance node;

means for displaying information contained in the representation of a business document associated with a selected document instance node; and a filter document type node expression, wherein:

at least one of the at least two levels further a comprises a filter document type node, the filter document type node being displayed when the filter document type node expression is met, at least one of the at least one document instance nodes is:
  (d) immediately subordinate to a filter document type node,
  (e) associated with a representation of the same type of business document as a document instance node in the same level of the same branch,
  (f) associated with a representation of a business document that is related to a representation of a business document associated with a document instance node in another level in the same branch,
  (g) associated with the same representation of a business document as one of the at least one document instance nodes immediately subordinate to a document type node in the same level,
  (h) a document instance in which the filter document type node expression is met.

60. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
  (a) immediately subordinate to a document type node,
  (b) associated with a representation of the same type of business document as a document instance node in the same level of the same branch, and
  (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a patient document type node, and at least one document type node of a hierarchical level subordinate to the level comprising a patient document type node comprises either an x-ray negative document type node, an evaluation document type node, a health insurance provider document type node, a health history document type node, or a prescription drug history document type node.

61. A software system comprising:

representations of a plurality of business documents;

means for relating the plurality of business documents;

means for displaying a hierarchical tree structure of representations of business documents, the tree structure having at least one branch, wherein:

the tree structure has a plurality of levels in a hierarchy, each level being in a dominant-subordinate relationship with each adjacent level, at least two levels in the same branch comprise at least one document type node and at least one document instance node, the document type nodes in at least two different levels in the same tree branch identify different types of business documents, each document instance node is:
  (a) immediately subordinate to a document type node,
  (b) associated with a representation of the same type of business document as a document instance node in the same level of the same branch, and
  (c) associated with a representation of a business document that is related to a representation of a business document associated with a document instance node in another level in the same branch;

means for selecting a particular document instance node;

means for displaying information contained in the representation of a business document associated with a selected document instance node; and wherein a document type node of a dominant hierarchical level comprises a purchaser document type node, and at least one document type node of a hierarchical level subordinate to the level comprising a purchaser document type node comprises either a purchaser application document type node, an income document type node, a tax form document type node, balance sheet document type node, an investment document type node, a lease document type node, a sales contract document type node, a lien document type node, or a land title document type node.

62. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node;
means for displaying information contained in the representation of a business document associated with the selected document instance node; and
wherein a document instance node of a dominant hierarchical level comprises a patient document instance node, and at least one document instance node of a hierarchical level subordinate to the level comprising a patient document instance node comprises either an x-ray negative document instance node, an evaluation document instance node, a health insurance provider document instance node, a health history document instance node, or a prescription drug history document instance node.

63. A software system comprising:
representations of a plurality of business documents;
means for relating the plurality of business documents;
means for displaying a hierarchical tree structure of representations of business documents, the tree structure having at least one branch, wherein:
the tree structure has a plurality of levels in a hierarchy, each level being in a dominant-subordinate relationship with each adjacent level,
at least two levels in the same branch comprise at least one document instance node,
the document instance nodes in at least two different levels of the same tree branch are associated with representations of different types of business documents,
each document instance node is:
  (a) associated with a representation of the same type of business document associated with a document instance node in the same level of the same branch
  (b) associated with a representation of a business document that is related to a representation of a business document associated with a document instance node in another level in the same branch;
means for selecting a particular business document instance node;
means for displaying information contained in the representation of a business document associated with the selected document instance node; and
wherein a document instance node of a dominant hierarchical level comprises a purchaser document instance node, and at least one document instance node of a hierarchical level subordinate to the level comprising a purchaser document instance node comprises either a purchaser application document instance node, an income document instance node, a tax form document instance node, a balance sheet document instance node, an investment document instance node, a lease document instance node, a sales contract document instance node, a lien document instance node, or a land title document instance node.

* * * * *